US012796578B2

(12) United States Patent
Pham et al.

(10) Patent No.: US 12,796,578 B2
(45) Date of Patent: Nov. 17, 2026

(54) WEEDING DEVICE

(71) Applicant: CANADIAN TIRE CORPORATION, LIMITED, Toronto (CA)

(72) Inventors: Wendy Pham, Toronto (CA); John Schmider, Scarborough (CA); Samuel Cheng, Toronto (CA); Tomasz Piotrowski, Oshawa (CA); Abdul Haleem Ahamed Koya, Oakville (CA)

(73) Assignee: CANADIAN TIRE CORPORATION, LIMITED, Toronto (CA)

( * ) Notice: Subject to any disclaimer, the term of this patent is extended or adjusted under 35 U.S.C. 154(b) by 335 days.

(21) Appl. No.: 18/570,986

(22) PCT Filed: Sep. 8, 2022

(86) PCT No.: PCT/CA2022/051342

§ 371 (c)(1),
(2) Date: Dec. 15, 2023

(87) PCT Pub. No.: WO2023/035070

PCT Pub. Date: Mar. 16, 2023

(65) Prior Publication Data

US 2024/0284813 A1 Aug. 29, 2024

Related U.S. Application Data

(60) Provisional application No. 63/241,661, filed on Sep. 8, 2021.

(51) Int. Cl.
*A01B 1/16* (2006.01)
*A01B 1/18* (2006.01)

(52) U.S. Cl.
CPC . *A01B 1/16* (2013.01); *A01B 1/18* (2013.01)

(58) Field of Classification Search
CPC .............. A01B 1/16; A01B 1/165; A01B 1/18
See application file for complete search history.

(56) References Cited

U.S. PATENT DOCUMENTS 843,399 A * 2/1907 King ........................ A01B 1/16 7/114
2,035,967 A * 3/1936 Humphrey ............... A01B 1/18 294/50.8

(Continued)

FOREIGN PATENT DOCUMENTS

CA 2353105 C 6/2004
CA 2732326 C 5/2018
EP 2656706 A1 * 10/2013 ............. A01B 1/165

OTHER PUBLICATIONS

Notice of Allowance and Fees Due for U.S. Appl. No. 29/871,825, dated Apr. 2, 2025, (8 pages).

(Continued)

*Primary Examiner* — Christopher J Sebesta
*Assistant Examiner* — Joel F. Mitchell
(74) *Attorney, Agent, or Firm* — WOMBLE BOND DICKINSON (US) LLP

(57) ABSTRACT

A device for removing weeds from a lawn or garden surface comprising: a drive shaft having a first end configured to operatively couple to a power unit for rotation about a longitudinal axis of the drive shaft and a second, free distal end; coupled to the second end, an auger having one or more flights and a boring member; and a weed engagement member axially coupled to the drive shaft at a longitudinal position intermediate the auger and the first end. A base member of the weed engagement member has at least one grasping finger depending therefrom towards the auger and axially offset from the longitudinal axis. Rotation of the drive shaft in a first direction when the boring member is in contact with the surface moves the auger into engagement (Continued)

with the weed and the weed engagement member is drawn towards and into engagement with the weed and vice-versa.

18 Claims, 21 Drawing Sheets

(56) References Cited

U.S. PATENT DOCUMENTS

| | | | | |
|---|---|---|---|---|
| 2,689,762 | A * | 9/1954 | Krumm | A01B 1/165<br>30/276 |
| 3,444,934 | A | 5/1969 | Alberto | |
| 4,213,504 | A | 7/1980 | Schneider | |
| 4,456,075 | A | 6/1984 | Hostetter | |
| 5,261,496 | A | 11/1993 | Smotherman | |
| 6,257,346 | B1 | 7/2001 | Schofield | |
| 6,595,298 | B1 | 7/2003 | Crady | |
| D479,677 | S | 9/2003 | Van Wambeke | |
| 6,722,444 | B2 | 4/2004 | McKill | |
| 6,736,217 | B2 | 5/2004 | Brown | |
| 6,871,484 | B1 | 3/2005 | Sartain | |
| D510,512 | S | 10/2005 | Robson | |
| D510,688 | S | 10/2005 | Shepherd | |
| 6,955,227 | B1 | 10/2005 | Motosko | |
| D530,163 | S | 10/2006 | Xue-Feng | |
| D600,516 | S | 9/2009 | Tinius | |
| D600,517 | S | 9/2009 | Tinius | |
| D628,034 | S | 11/2010 | Albertson | |
| D645,313 | S | 9/2011 | Albertson | |
| D657,212 | S | 4/2012 | Pare | |
| 8,613,326 | B2 | 12/2013 | Pare et al. | |
| 8,813,862 | B2 | 8/2014 | Yamaoka et al. | |
| 8,820,426 | B2 | 9/2014 | Lv | |
| D758,151 | S | 6/2016 | Tinius | |
| D776,995 | S | 1/2017 | Schoch | |
| 9,736,972 | B1 | 8/2017 | Pope | |
| D798,679 | S | 10/2017 | Tinius | |
| D807,715 | S | 1/2018 | Znova | |
| D830,798 | S | 10/2018 | Tinius | |
| 10,257,971 | B2 | 4/2019 | Kittelson | |
| D919,387 | S | 5/2021 | Tinius | |
| D973,454 | S | 12/2022 | Dong | |
| D996,933 | S | 8/2023 | Lin | |
| D1,009,085 | S | 12/2023 | Hu | |
| D1,085,169 | S * | 7/2025 | Pham et al. | D8/8 |
| D1,098,859 | S * | 10/2025 | Pham et al. | D8/7 |
| D1,098,860 | S * | 10/2025 | Pham et al. | D8/8 |
| 2006/0011358 | A1 | 1/2006 | Motosko | |
| 2008/0172801 | A1 * | 7/2008 | Biag | A01B 1/16<br>7/114 |
| 2011/0203815 | A1 | 8/2011 | Pare et al. | |
| 2012/0085558 | A1 | 4/2012 | Lv | |
| 2012/0227270 | A1 | 9/2012 | Ito | |
| 2014/0246214 | A1 | 9/2014 | Racov | |
| 2014/0259692 | A1 | 9/2014 | Racov | |
| 2021/0235607 | A1 | 8/2021 | Lee | |
| 2022/0346298 | A1 | 11/2022 | Davis | |
| 2024/0049699 | A1 | 2/2024 | Russ | |
| 2024/0284812 | A1 | 8/2024 | Wu | |
| 2024/0284813 | A1 | 8/2024 | Pham | |

OTHER PUBLICATIONS

Notice of Allowance and Fees Due for U.S. Appl. No. 30/006,588, dated Jul. 10, 2025, 7 pages.

International Search Report and Written Opinion for International Application No. PCT/CA2022/051342, dated Dec. 20, 2022 (11 pages), Canadian Intellectual Property Office, Quebec, Canada.

* cited by examiner

WEEDING DEVICE

CROSS-REFERENCE TO RELATED APPLICATIONS

This application is a National Stage Application, filed under 35 U.S.C. § 371, of International Application No. PCT/CA2022/051342 filed Sep. 8, 2022, which international application further claims priority to and the benefit of U.S. Provisional Patent Application No. 63/241,661 filed on Sep. 8, 2021, the entire contents of both of which as are hereby incorporated herein by reference.

FIELD

The specification relates generally to weeders, and specifically to weeding devices and accessories therefor.

BACKGROUND

Typically, manual or motorized weeding devices utilize a grabbing and pulling action to remove weeds from a lawn or a garden surface. Due to varying characteristics of weeds and their root systems, grabbing and pulling action alone are often insufficient for complete removal of the roots from weeds, which can result in regrowth of weeds. Further, many conventional manual or motorized weeding devices create large holes on the lawn or garden surface, which is not esthetically pleasing. In some weeders which comprise ejectors, there are difficulties with properly ejecting the weed either due to the positioning of the ejector, or difficulty in operating the ejector.

SUMMARY

According to embodiments, there is provided a device for removing weeds from a lawn or garden surface. The device comprises a drive shaft having a first end and a second end, the first end being configured to operatively couple to a power unit for rotation about a longitudinal axis of the drive shaft and the second end being a free end distal from the first end. Coupled to the second end, there is an auger having one or more flights about the longitudinal axis and a boring member. The device also comprises a weed engagement member axially coupled to the drive shaft at a longitudinal position intermediate the auger and the first end, the weed engagement member having: a base member, and at least one grasping finger depending from the base member towards the auger, the at least one finger being axially offset from the longitudinal axis. When the boring member is in contact with the lawn or garden surface and the drive shaft is driven in a first direction of rotation about the longitudinal axis, the auger is driven into engagement with at least a portion of a weed and the weed engagement member is drawn towards the lawn or garden surface and into engagement with the at least a portion of the weed. According to some embodiments, the device is further enabled to drive the auger away from the lawn or garden surface with the weed engagement member and the portion of the weed when the drive shaft is driven in a second direction of rotation about the longitudinal axis.

According to some embodiments, the at least one grasping finger comprises a pair of opposing grasping fingers depending therefrom towards the auger. According to some embodiments, the at least one grasping finger is bi-directional. According to some embodiments, each one of the pair of opposing grasping fingers are angularly offset from the other finger.

According to some embodiments, the device further comprises a shaft casing proximate the first end of the drive shaft, the shaft casing rotationally decoupled from the drive shaft.

According to some embodiments, the device further comprises an ejector. The ejector comprises: an arm having a first end and a second end distal the first end, the second end having a platform member proximate the base member, the second end being configured to rotationally couple with the drive shaft when the drive shaft is driven in one or more of the first direction and the second direction; a cutting blade coupled to the platform member of the second end of the arm and oriented to cut at least a portion of a weed held by the weed engagement member; and an actuator operatively coupled to the arm and configured to, via axial translation of the arm and the platform member relative to the drive shaft, move the cutting blade into a cutting position in which the cutting blade is in cutting engagement with the at least a portion of the weed held by the weed engagement member for release therefrom and the ejection from the device.

According to some embodiments, the cutting blade is generally tapered away from the platform member. According to some embodiments, the taper of the cutting blade is shaped so as to exert a radial cutting force on the at least a portion of the weed during movement of the cutting blade into the cutting position.

According to some embodiments, the auger comprises a guide slot through which at least a portion of the cutting blade travels to reach the cutting position.

According to some embodiments, the device further comprises a biasing member operatively coupled to the arm and the weed engagement member, the biasing member configured to bias the arm and platform member coupled to the cutting blade away from the auger. According to some embodiments, the biasing member comprises a helical spring.

According to some embodiments, the actuator comprises the shaft casing.

According to some embodiments, the actuator comprises a handle operatively connected to the arm for axial translation therewith and rotationally decoupled from the drive-shaft.

According to some embodiments, the device further comprises: a housing member having a first end and a second end, the first end being configured to operatively couple to a power unit and the second end being a free end proximate the weed engagement member, and an actuator housing operatively coupled to the actuator. According to some embodiments, the housing member and the actuator housing are rotationally decoupled from the drive shaft.

According to some embodiments, there is provided a motorized system for removing weeds from a lawn or garden surface comprising: a power unit; and the device for removing weeds from a lawn or garden surface.

According to some embodiments, there is provided a weed engagement tool for a weeding device comprising: a base member configured to axially couple with a drive shaft having a free end configured to be driven into engagement with at least a portion of a weed; and at least one grasping finger depending from the base member and towards the free end when coupled to the drive shaft, the at least one grasping finger being axially offset from a longitudinal axis of the drive shaft.

According to some embodiments, the at least one grasping finger comprises a pair of opposing grasping fingers depending therefrom towards the auger. According to some embodiments, the at least one grasping finger is bi-directional.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
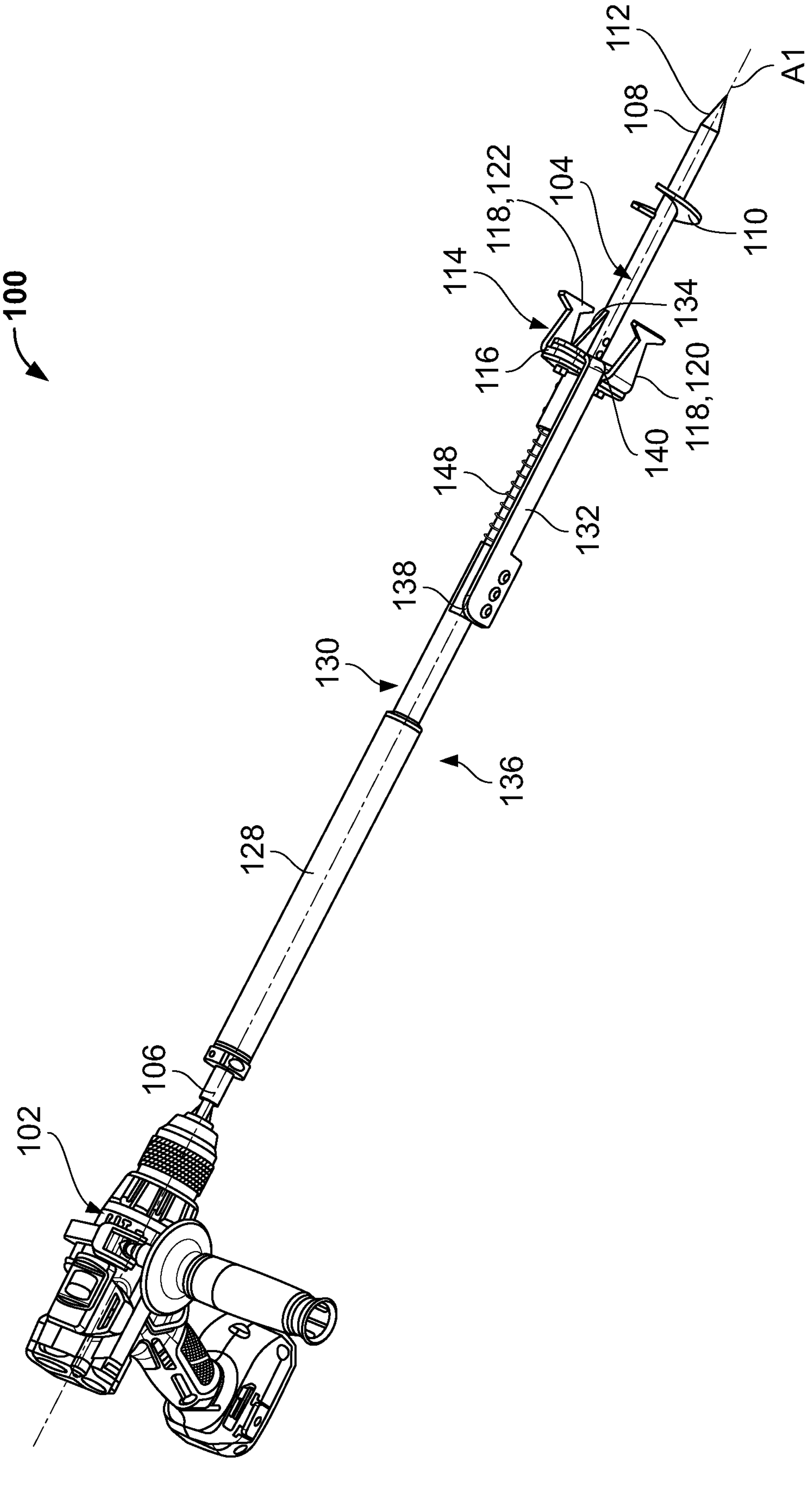
FIG. 1 depicts a weeding device, according to non-limiting embodiments.

Herein described are weeding devices and related devices or accessories in which, at least according to some embodiments, the drive shaft can be operated to remove weeds from a lawn or garden surface. As described further below, the weeding devices comprise a drive shaft axially coupled to a weed engagement member that is configured to rotationally bore into a lawn or garden surface to come into contact with a weed and rotationally driven away from the lawn or garden surface where the weed engagement member maintains contact with at least a portion of the weed. According to some embodiments, the weeding devices comprise an ejector that allows for ejection of weeds from the weeding device without manual removal from the device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Attention is directed to FIG. 1 which depicts a schematic of a device for removing weeds from a lawn or garden surface, also referred to herein as weeding device 100, according to non-limiting embodiments. Weeding device 100 comprises a drive shaft 104 configured to operatively couple to a power unit 102 at a proximal end 106, for rotation about an axis of rotation A1 defined by the drive shaft 104. According to some embodiments, weeding device 100 is provided with power unit 102 to provide a motorized system to for removing weeds from a lawn or garden surface. Alternatively, weeding device 100 may be provided separately for operation with a power unit, such as power unit 102. Any suitable power unit is contemplated. For example, according to some embodiments, power unit 102 comprises a cordless power drill. According to some embodiments, in operation, the rotational speed of the drive shaft is about 100 revolutions per minute (RPM) or less. According to some embodiments, the power unit 102 is configured to rotate the drive shaft at a speed in a range of about 50 RPM to about 100 RPM. According to some embodiments, the range is about 5 RPM to about 100 RPM.

According to some embodiments, the power unit is battery powered. According to some embodiments, the battery or batteries are rechargeable. According to some embodiments, the battery voltage is about 18 volts (V). Any suitable power source for the power unit is contemplated.

According to some embodiments, drive shaft 104 comprises one or more drive shaft members or components to form the drive shaft 104 as shown and described. According to some embodiments, drive shaft 104 is a unitary structure. A distal end 108 of the drive shaft 104 comprises an auger 110 and a boring member 112. Weeding device 100 further comprises a weed engagement member 114 axially coupled to the drive shaft 104 along axis A1, near the auger 110.

Figure 2A:
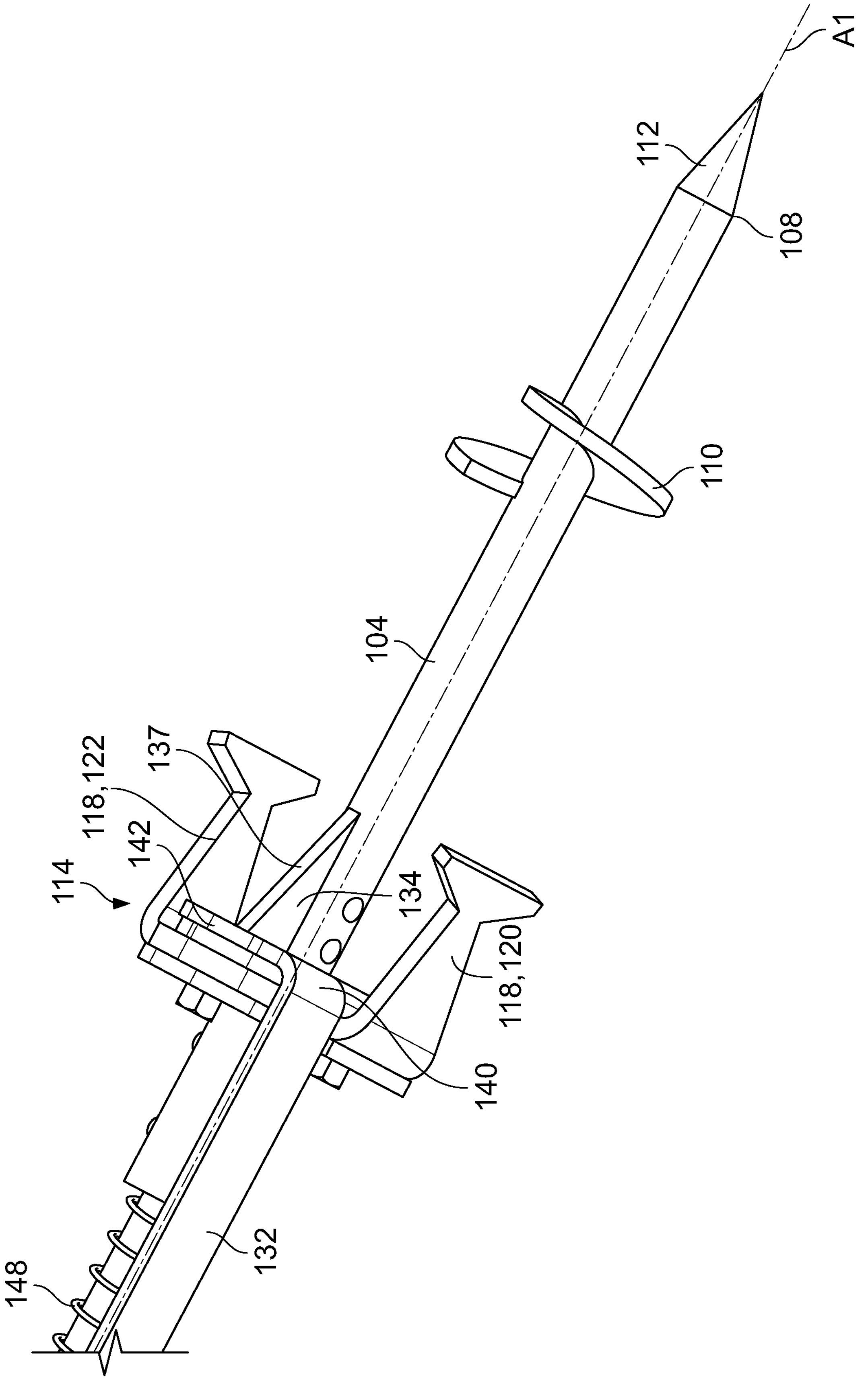
FIGS. 2A and 2B depict an enlarged view of a weed engagement member, according to non-limiting embodiments.
Figure 2B:
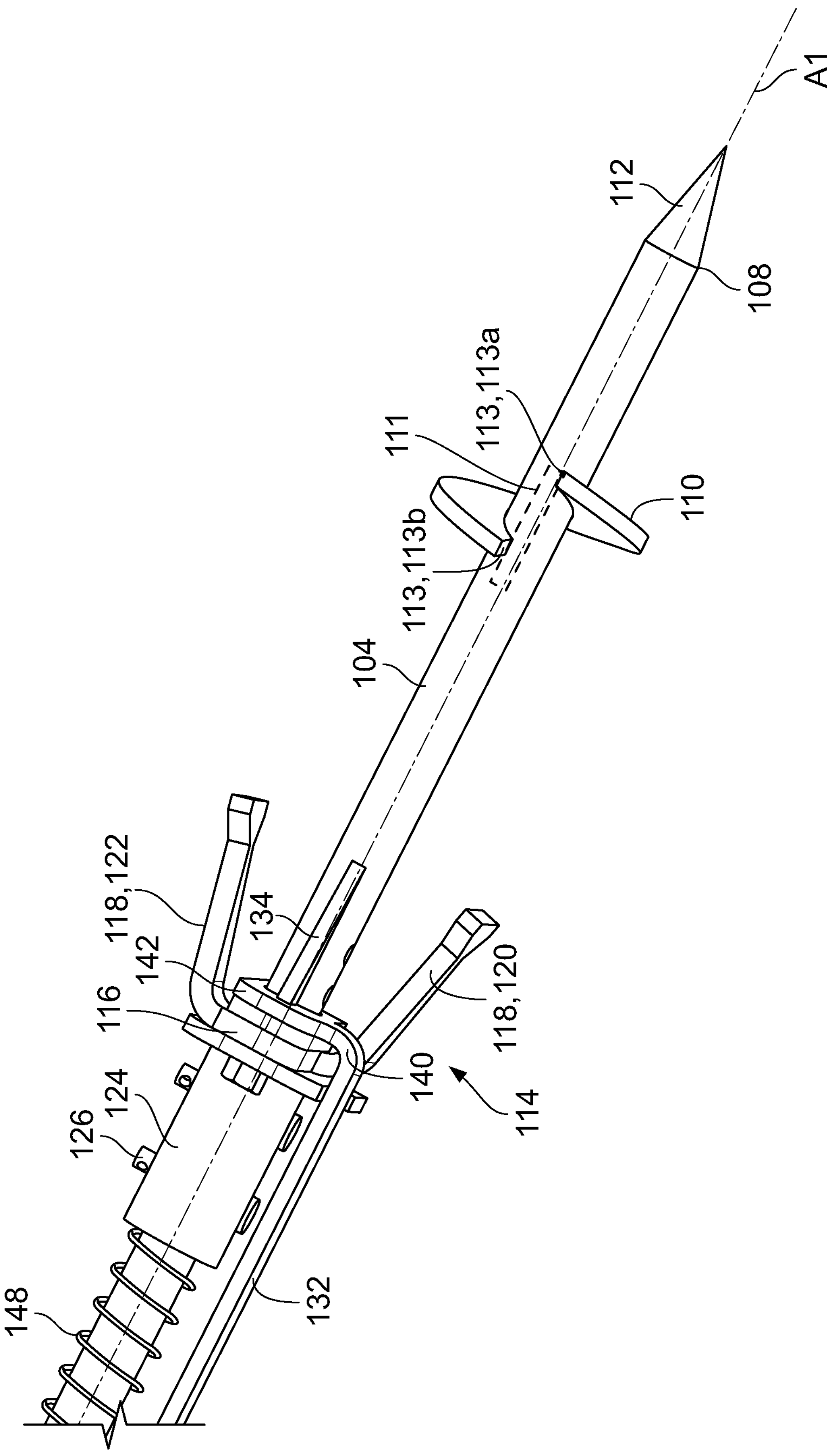
Figure 2D:
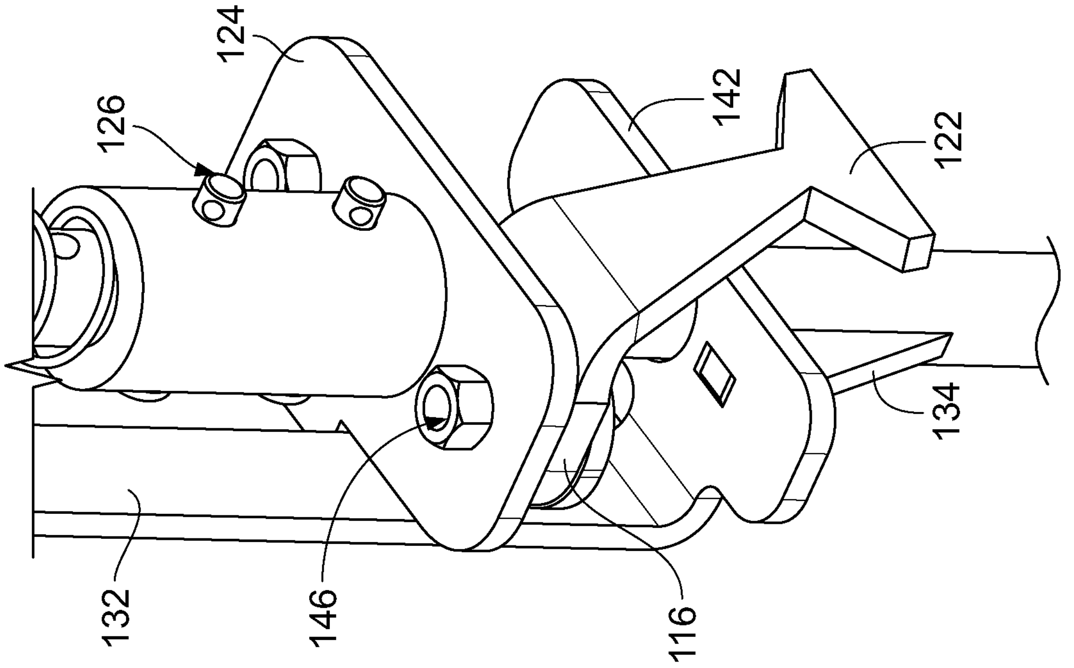
FIGS. 2C, 2D and 2E depict a schematic of a weed engagement member and an ejector arm and a cutting blade, according to non-limiting embodiments.
Figure 2C:
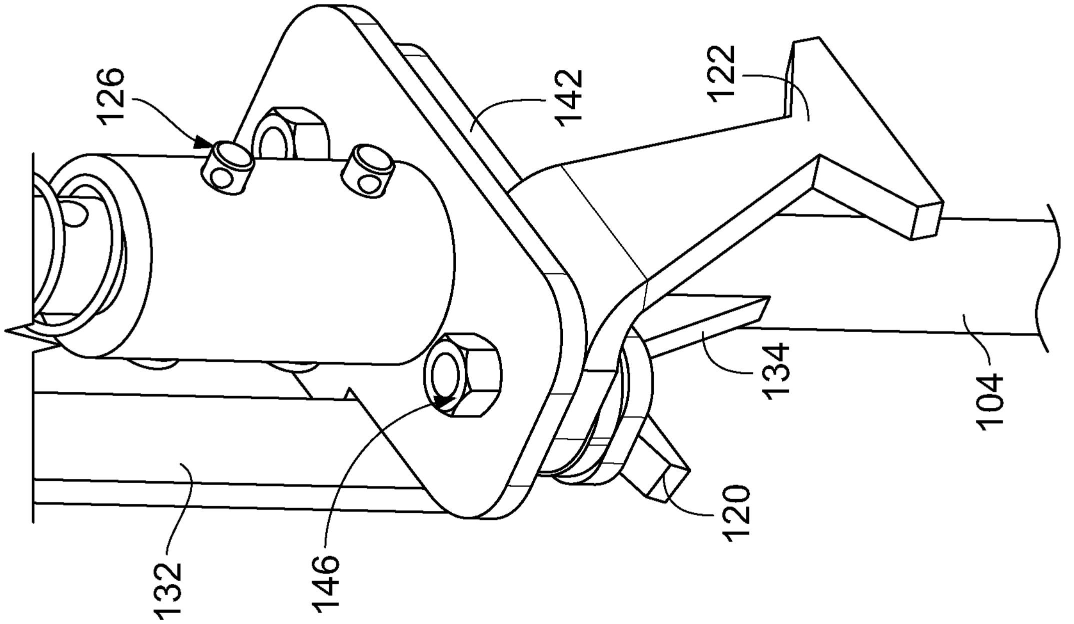
Figure 2F:
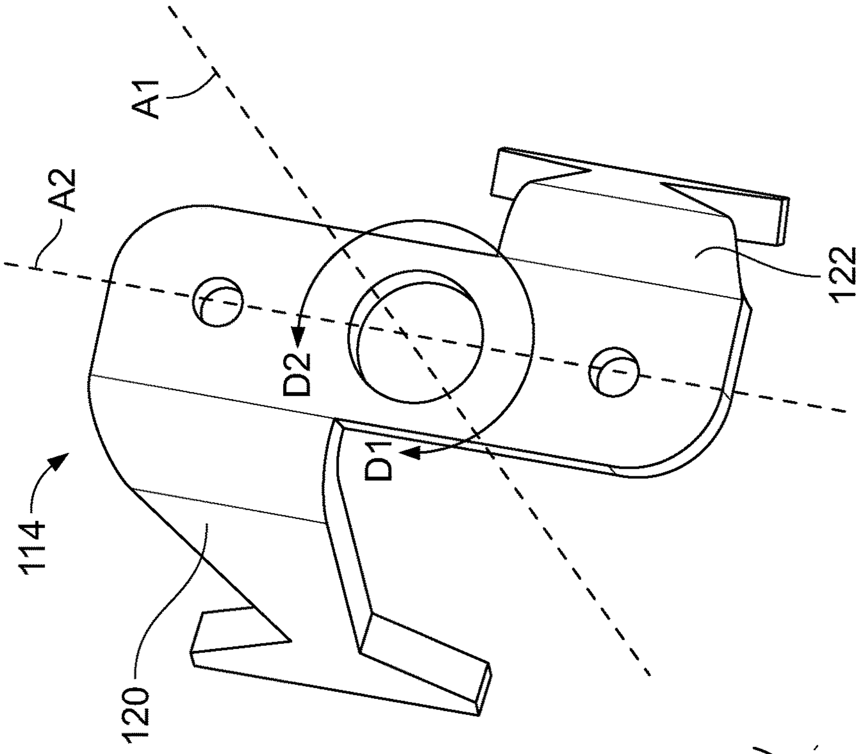
FIG. 2F depicts an enlarged view of a weed engagement member having a pair of opposing grasping fingers, according to non-limiting embodiments.
Figure 2E:
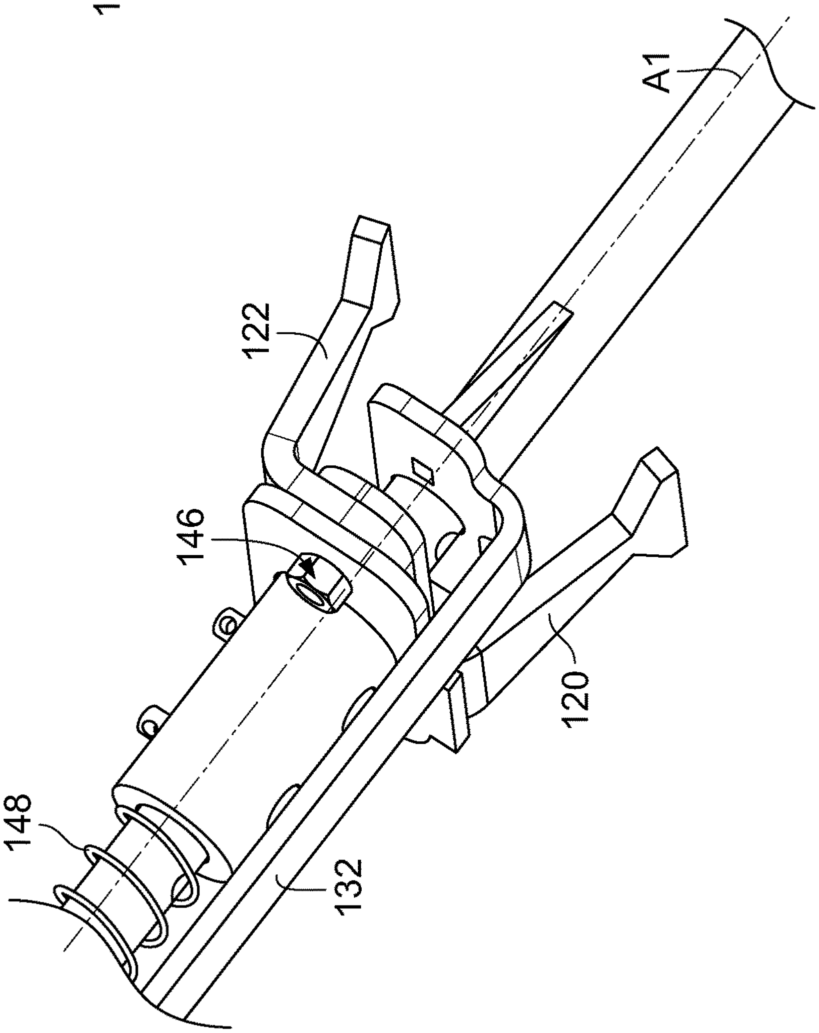
Figure 2H:
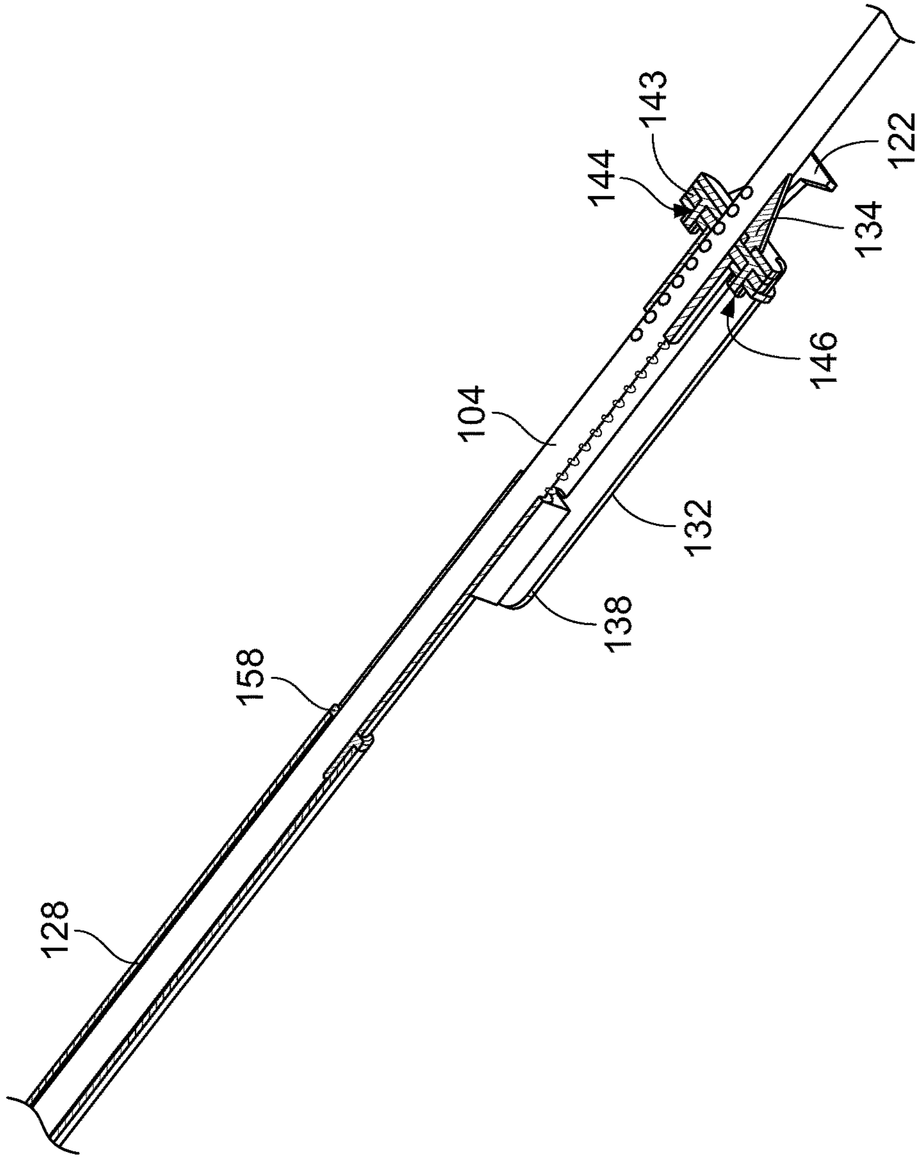
FIG. 2H depicts a cross-sectional view of a section of the weeding device of FIG. 1, illustrating the positioning of a shaft casing on an ejector, according to non-limiting embodiments.
Figure 2G:
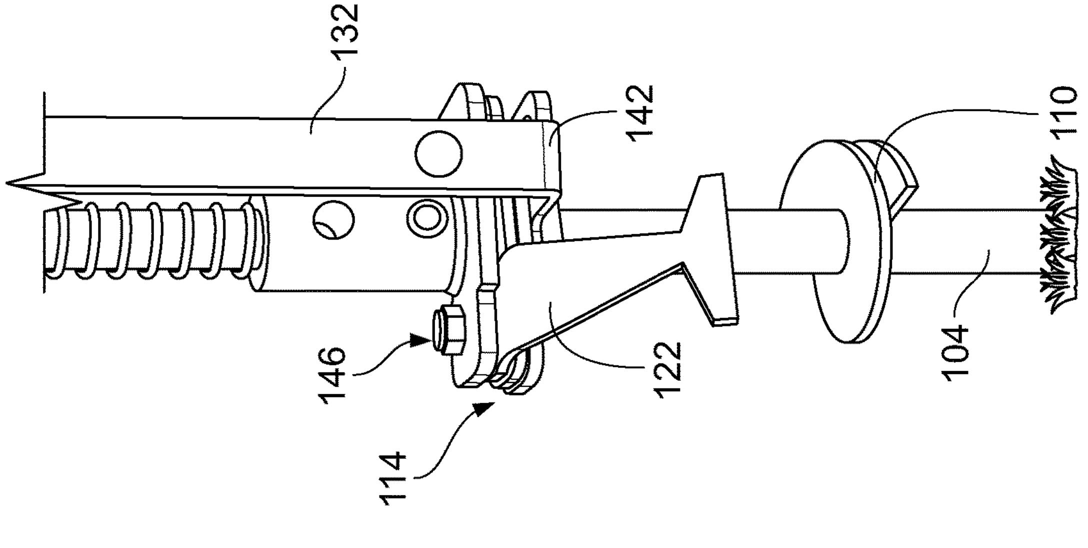
FIG. 2G depicts an example weed engagement member in contact with a weed or at least a portion of a weed, according to non-limiting embodiments.
Figure 2J:
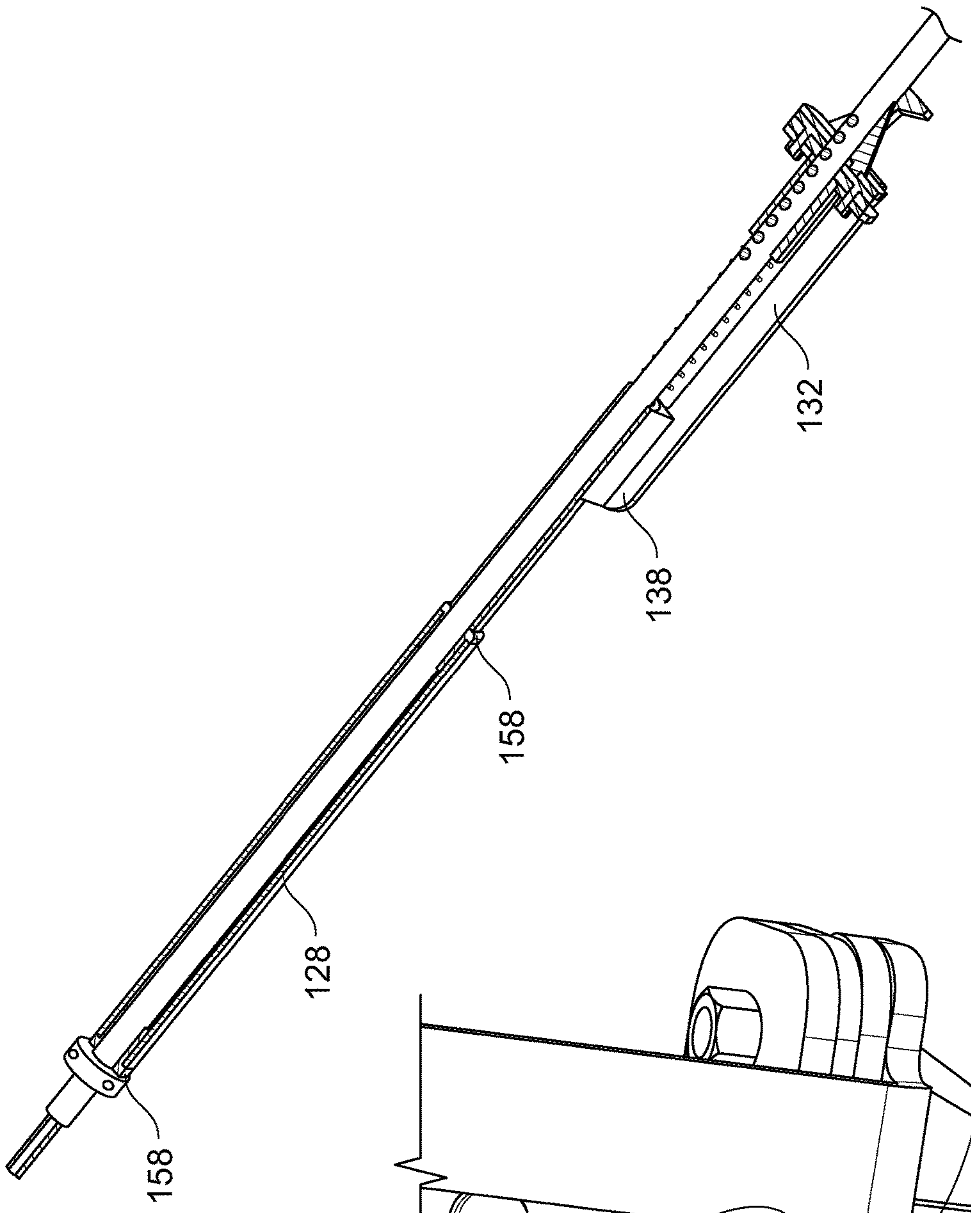
FIG. 2J depicts another cross-sectional view of the weeding device of FIG. 1, illustrating the positioning of a shaft casing on an ejector, according to non-limiting embodiments.

The weed engagement member 114 further comprises a base member 116 and at least one grasping finger depending therefrom towards the auger 110, such as a pair of opposing grasping fingers 118 (individually referred to herein as finger 120, and finger 122) (see FIGS. 2A and 2B). Any suitable shape and/or orientation of base member 116 is contemplated. For example, according to some embodiments, base member 116 comprises at least one planar surface from which the pair of opposing grasping fingers 118 depend therefrom (see FIGS. 2C-2F). According to some embodiments, the base member 116 of the weed engagement member 114 comprises more than one shape and/or component. Each one of the pair of opposing grasping fingers 120, 122 may be axially offset from the axis A1 along axis A2 and enabled to rotate around the drive shaft 104 about axis A1 (see FIG. 2F). Each one of the pair of opposing grasping fingers 120, 122 may be bi-directional, which allows contact with a weed or at least a portion of a weed during rotation around the drive shaft 104 about axis A1, in a first direction of rotation, such as D1, and/or a second direction of rotation, such as D2 (FIG. 2F). For example, grasping fingers 118 may comprise one or more prongs, which may be shaped and positioned on each one of grasping fingers 118 such that when weed engagement member 114 rotates in both the first direction of rotation and the second direction of rotation, the prongs assist in grasping at least a portion of the weed that is to be held by the weed engagement member. The first direction of rotation about axis A1 may comprise a clockwise direction, and the second direction of rotation about axis A1 may comprise a counter clockwise direction.

Figure 10B:
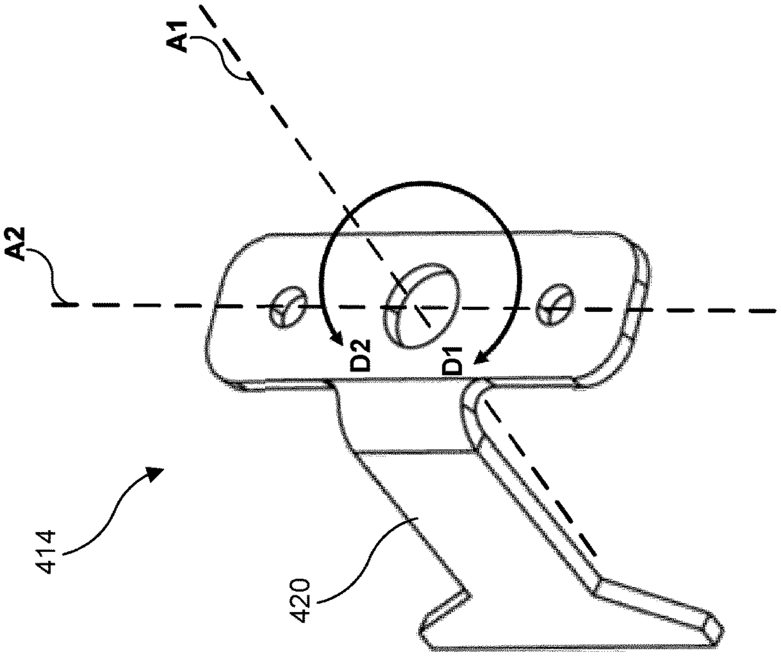
FIGS. 10A and 10B depict enlarged views of a weed engagement tool for a weeding device having one grasping finger, according to non-limiting embodiments.
Figure 10A:
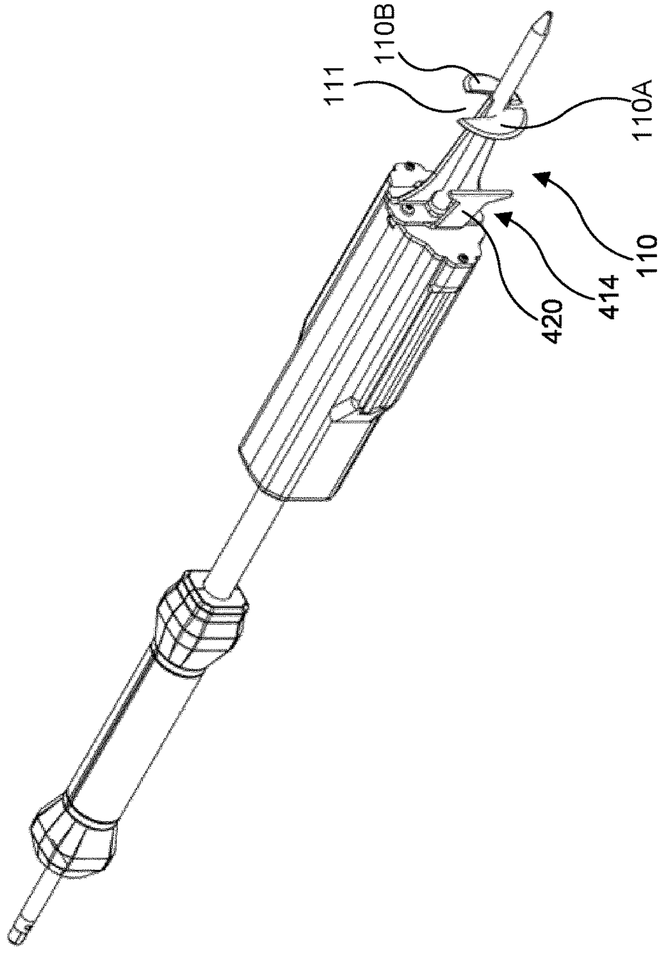

Although pair of opposing grasping fingers 118 is shown, it is understood that one or more grasping fingers is also contemplated. For example, as shown in FIGS. 10A and 10B, example weed engagement member 414 comprises a single grasping finger 420 which may be similarly configured to grasping fingers 118. Any suitable number, shape and/or arrangement of grasping fingers are contemplated.

According to some embodiments, the weed engagement member 114 is in fixed rotation with the drive shaft 104 about axis A1. For example, the weed engagement member 114 may be rotationally coupled to the drive shaft 104 through a weed engagement mount 124 with at least one pin 126 extending through an opening in the drive shaft 104 (see FIGS. 2A-2G).

According to some embodiments, each one of the pair of opposing grasping fingers 120 and 122 are angularly offset from the other finger along axis A2 (see FIG. 2F). Each one of the pair of opposing grasping fingers may be angularly offset from the other finger at any angle suitable for facilitating contact with a weed or at least a portion of a weed as further described below. In other embodiments, any arrangement of the pair of opposing grasping fingers 118 is contemplated to facilitate contact with a weed or at least a portion of a weed. For example, the pair of opposing grasping fingers 118 may be directly opposed and not angularly offset.

According to some embodiments, the weed engagement member, including the at least one grasping finger (such as pair of grasping fingers 118 or grasping finger 420) comprises any suitable material or combination of materials. For example, the weed engagement member may comprise metal, plastic or any suitable combination thereof. According to some embodiments, the metal is steel.

Auger 110 comprises one or more flights. According to some embodiments, auger 110 comprises two flights. According to some embodiments, the auger 110 comprises a single flight. As discovered by the Applicant, incorporating an auger having a single flight, such as auger 110, usually allows for the operation of the weeding device 100 and removal of a weed or at least a portion of a weed without creating unnecessarily large holes on the lawn or garden surface which is not esthetically pleasing. The Applicant also discovered that providing auger 110 with a single flight usually reduces damage to the soil while removing the weed or at least a portion of a weed, as the single flight of auger 110 when removed from the soil usually allows soil to fall back into the hole in which a weed is removed from. According to some embodiments, auger 110 comprises a guide slot, such as guide slot 111, through which at least a portion of cutting blade 134 travels to reach a cutting position (discussed further below). For example, guide slot 111 may be defined by auger flight terminal edges 113 (individually, auger flight terminal edge 113*a* and auger flight terminal edge 113*b*). According to some embodiments, auger 110 comprises multiple auger portions, such as auger portions 110*a* and 110*b* (see, for example, FIGS. 10A and 10B) with guide slot 111 formed therebetween.

According to some embodiments, the weed engagement member 114 is provided as a separate assembly for use in a weeding device, such as weeding device 100, as a replacement component for or comprising the weeding device 100.

The drive shaft 104 is configured to operatively couple to the power unit 102, such that operation of the power unit 102 drives the rotation of the drive shaft 104. According to some embodiments, the auger 110 and the weed engagement member 114 are in fixed rotation with the drive shaft 104, such that they rotate about axis A1 when the power unit 102 drives rotation of the drive shaft 104.

When in operation according to at least some embodiments, to remove weeds from a lawn or garden surface, the boring member 112 of the weeding device 100 first comes into contact with the lawn or garden surface. As used herein, the term "lawn" may refer to an area on which grass grows, creating a grass surface. As used herein, the term "garden surface" may refer to any type of surface where grass, plants and/or other types of vegetation is typically grown and may also include rocks, wood chips, mulch, or other materials in areas that are not occupied by grass, plants or other types of vegetation. Boring member 112 may comprise any length or shape that is suitable to make contact with the lawn or garden surface and to facilitate use of the weeding device 100. Upon contact of the boring member 112 with the lawn or garden surface, such as surface 115 (FIG. 2G), and the drive shaft 104 rotates about axis A1 in a clockwise direction, for example, the auger 110 draws the weeding device 100 downwards into the ground, where the auger 110 comes into engagement with a weed or at least a portion of a weed. As the weeding device 100 is further driven into the ground from the rotation of the drive shaft 104, the auger 110 eviscerates the weed or at least a portion of the weed, such as the root, and the weed engagement member 114 is drawn towards the lawn or garden surface to come into engagement with the weed or a portion of the weed, such as the leaves, stems, or flowers. Due to the rotation of the drive shaft 104 about axis A1 in a first direction, such as a clockwise direction, the weeds or a portion of the weeds are captured or otherwise entangled by the pair of opposing grasping fingers 118 around the drive shaft 104 (see FIG. 2G).

According to some embodiments, when the drive shaft 104 rotates about axis A1 in a second direction opposite the first direction, such as a counter clockwise direction, the auger 110 is driven away from the ground and the lawn or garden surface along with the weed engagement member 114 including the weed or portion of the weed captured by the pair of opposing grasping fingers 118. The pair of opposing grasping fingers 118 may comprise any length or shape that is desirable to make contact with a weed or at least a portion of a weed and maintain contact as the weeding device 100 is driven into and out of the ground for removing weeds from a lawn or garden surface. As described above, according to some embodiments, the pair of opposing grasping fingers 118 are bi-directional (see FIGS. 2A and 2E), such that contact with a weed or at least a portion of a weed during rotation around the drive shaft 104 about axis A1 can be maintained, either in a first direction of rotation or a second direction of rotation due to the bi-directional nature of the pair of opposing grasping fingers 118.

According to some embodiments, the weeding device 100 includes a shaft casing 128 near the proximal end 106 of the drive shaft 104, where the shaft casing 128 is not rotationally coupled to the drive shaft 104. For example, when the drive shaft 128, auger 110 and the weed engagement member 114 are in rotation about axis A1, the shaft casing 128 may be configured such that it does not rotate about axis A1. For example, according to some embodiments, the shaft casing 128 is positioned on a bushing surrounding the drive shaft 104, on a proximal end 106 of the drive shaft 104 and a first end 138 of an arm 132, as further described below (see bushings 158 in FIGS. 2H, 2J to 2L). As would be understood, the placement of the shaft casing 128 on a bushing also allows the shaft casing 128 to be rotationally decoupled from the drive shaft 104. Any suitable means for rotationally decoupling the shaft casing 128 from the drive shaft 104 is contemplated. According to some embodiments, the shaft casing 128 may be positioned on a ball bearing, or other suitable structures or components that would allow the shaft casing 128 to be rotationally decoupled from the drive shaft 104. For example, according to some embodiments, shaft casing 128 may be coupled to the drive shaft 104 via one or more of a ball bearing and a bushing.

According to some embodiments, the weeding device 100 includes an ejector 130 comprising an arm 132, a cutting blade 134 and an actuator 136 (see FIG. 1). Arm 132 comprises a first end 138 and a second end 140, which may be distal the first end 138. The second end 140 comprises a platform member 142 near the base member 116 of the weed engagement member 114 (see FIG. 2A). According to some embodiments, the second end 140 is configured to rotationally couple with the drive shaft 104 when the drive shaft 104 is driven to rotate about axis A1 in one or more of the first direction D1 and the second direction D2.

Figure 2I:
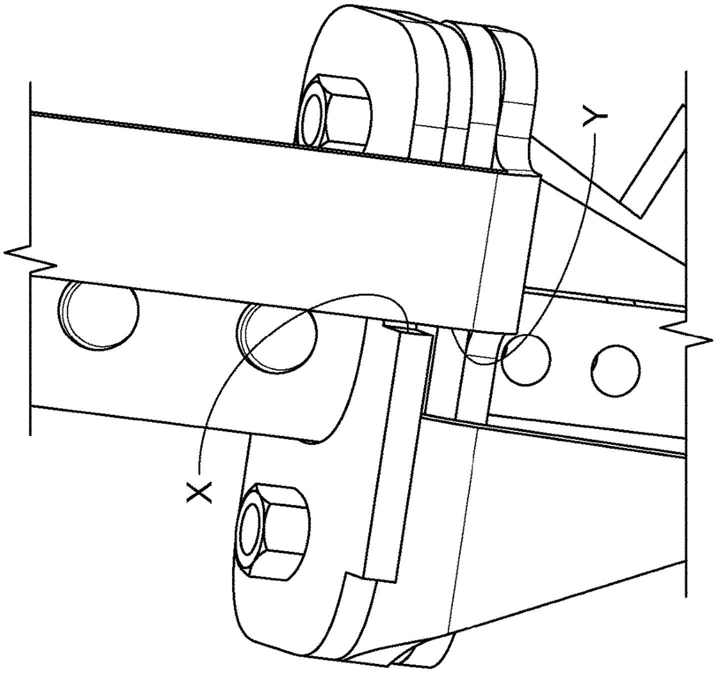
FIG. 2I depicts an enlarged view of a weed engagement mount and an ejector arm, according to non-limiting embodiments.
Figure 2L:
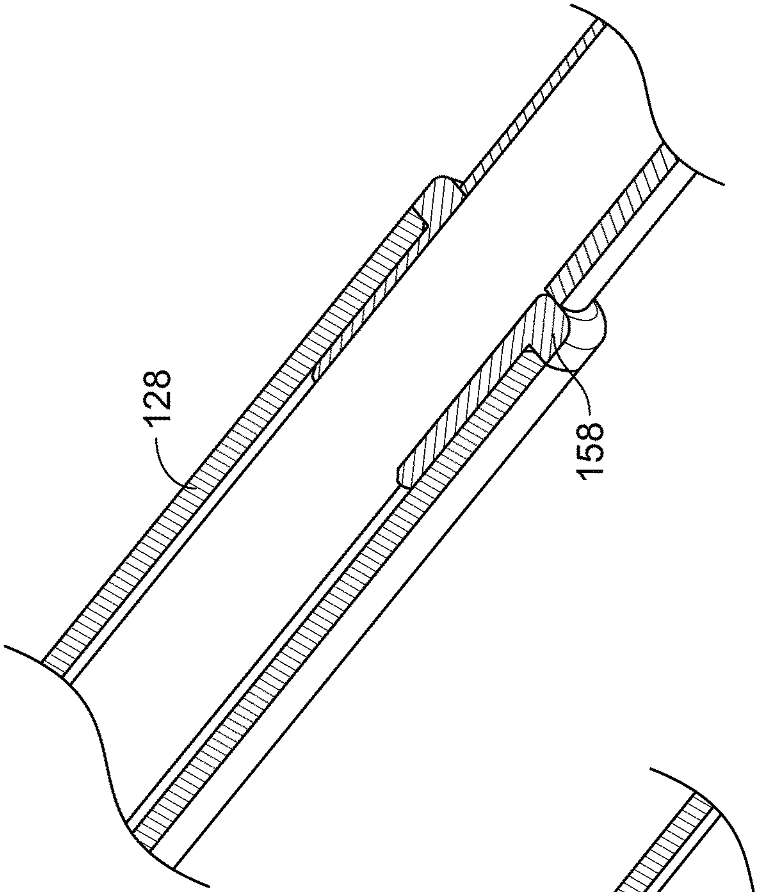
FIGS. 2K and 2L depict enlarged cross sectional views of the shaft casing and bushings, according to non-limiting embodiments.
Figure 2K:
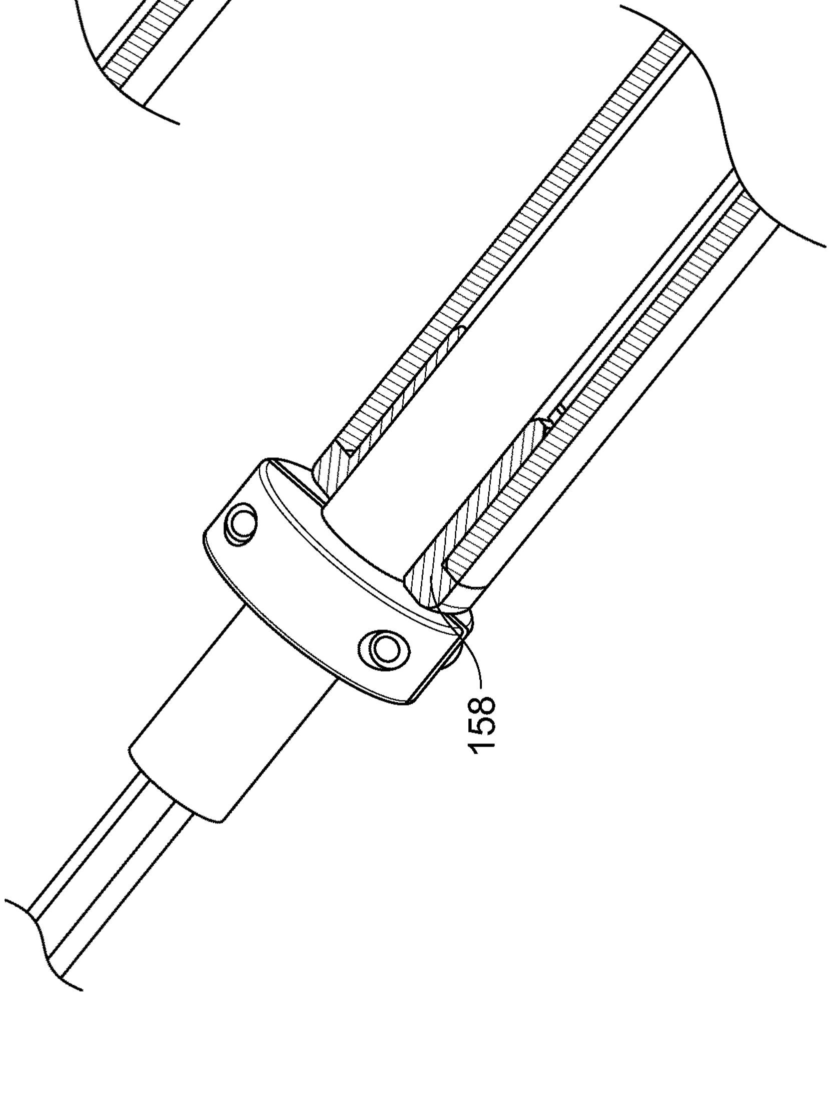

As described above, according to some embodiments, the weed engagement member 114 is in fixed rotation with the drive shaft 104 about axis A1. For example, during at least some embodiments, when the weeding device 100 is in rotation about axis A1, the ejector 130 and the weed engagement member 114 are both rotationally coupled to the drive shaft 104 by way of driving surface contact during rotation about axis A1. In operation, the weed engagement mount 124 or one of the pair of opposing fingers 118 bears against the second end 140 of the arm 132 such that when the weed engagement member 114 rotates about axis A1, either in a first direction of rotation D1 or a second direction of rotation D2, the arm 132 is also rotationally coupled to the drive shaft 104. The weed engagement mount 124 may comprise a notch, or any suitable shape that would allow the second end 140 of the arm 132 to be borne against the weed engagement mount 124. For example, the weed engagement mount 124 may comprise driving surface X positioned to bear against arm surface Y (see FIG. 2I).

According to some embodiments, the weed engagement mount 124 is coupled to the weed engagement member 114 via a keeper plate 143 with one or more fasteners, such as bolts 144 and nuts 146, wherein the weed engagement member 114 is flanked by the keeper plate with two bolts and the weed engagement mount 124, secured by a pair of nuts 146 (see FIGS. 2A-2E). Any suitable form or manner of mechanical joining of the weed engagement mount 124 and the weed engagement member 114 is contemplated, such as a single cast or welding. For example, according to some embodiments, weed engagement mount 124 and weed engagement member 114 are cast together as a unitary component.

As shown in FIGS. 1, 2A-2E and 3, the cutting blade 134 is coupled to the platform member 142 on the second end of the arm 132, and the cutting blade 134 is oriented to cut at least a portion of a weed held by the weed engagement member 114, for example, as the drive shaft 104 rotates about axis A1. Any suitable manner of coupling cutting blade 134 to platform member 142 is contemplated. For example, according to some embodiments, cutting blade 134 is of unitary construction with platform member 142.

The actuator 136 is operatively coupled to the arm 132 at the first end 138 and configured to, via axial translation of the arm 132 and the platform member 142 relative to the drive shaft 104, move the arm 132 and platform member 142 along the length of the drive shaft 104 towards the distal end 108 of the drive shaft 104, such that the cutting blade 134 will come into contact with and cut the weed or at least a portion of the weed held by the weed engagement member 114. Any weed or a portion of a weed remaining is usually released and ejected from the weeding device 100 from the axial translation of the platform member 142 (see FIGS. 2B-2E and 3). Any weed or a portion of a weed remaining may be further released and ejected from the weeding device 100 by rotating the weeding device 100 about axis A1 (by way of centrifugal force during rotation about axis A1).

The platform member 142 may comprise any shape suitable for coupling to the cutting blade 134 and to facilitate the movement of the cutting blade 134 along the drive shaft 104. The cutting blade 134 may comprise any thickness or length suitable to facilitate cutting and ejection of the weed from the weed engagement member 114 of the weeding device 100.

Figure 3:
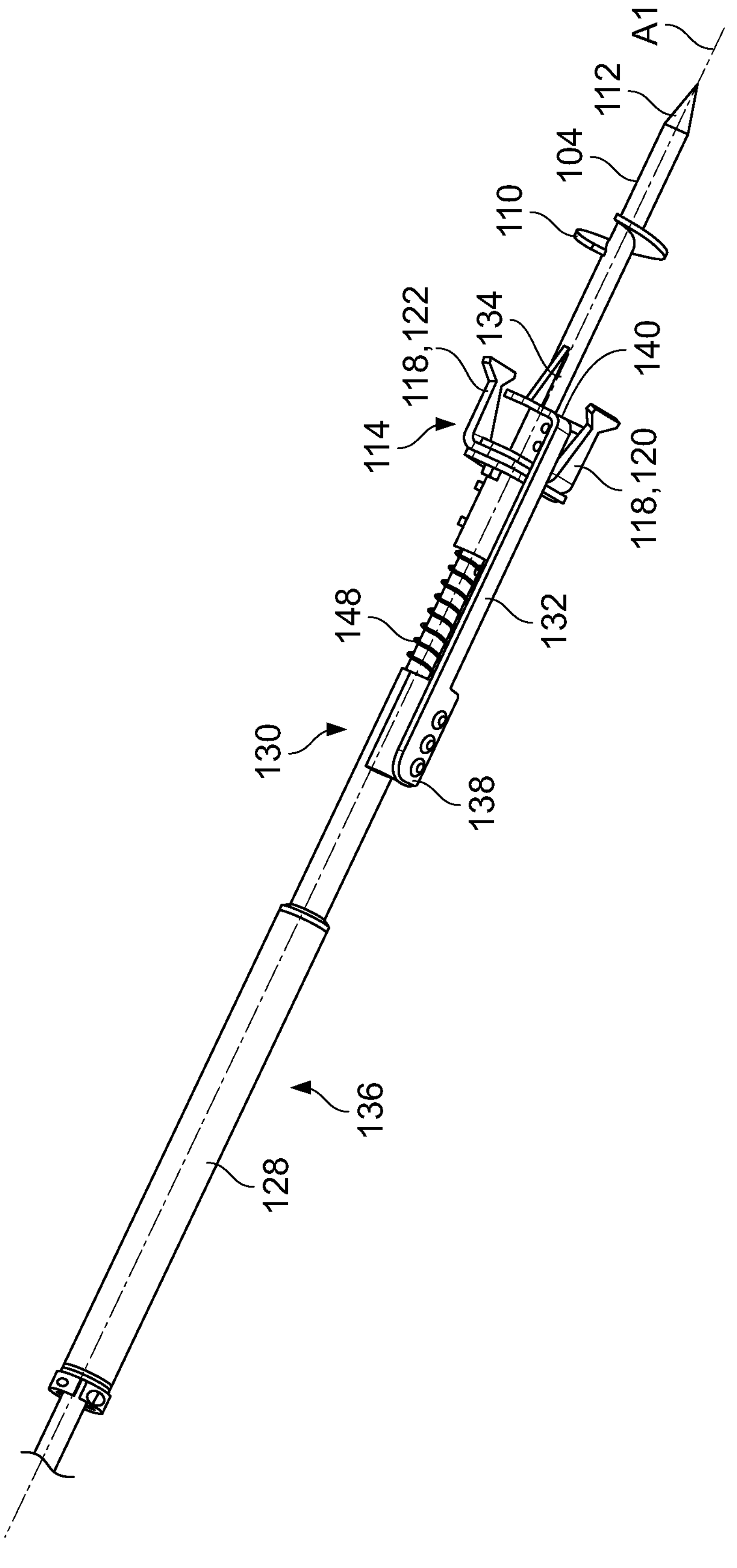
FIG. 3 depicts a view of an ejector, according to non-limiting embodiments.
Figure 4A:
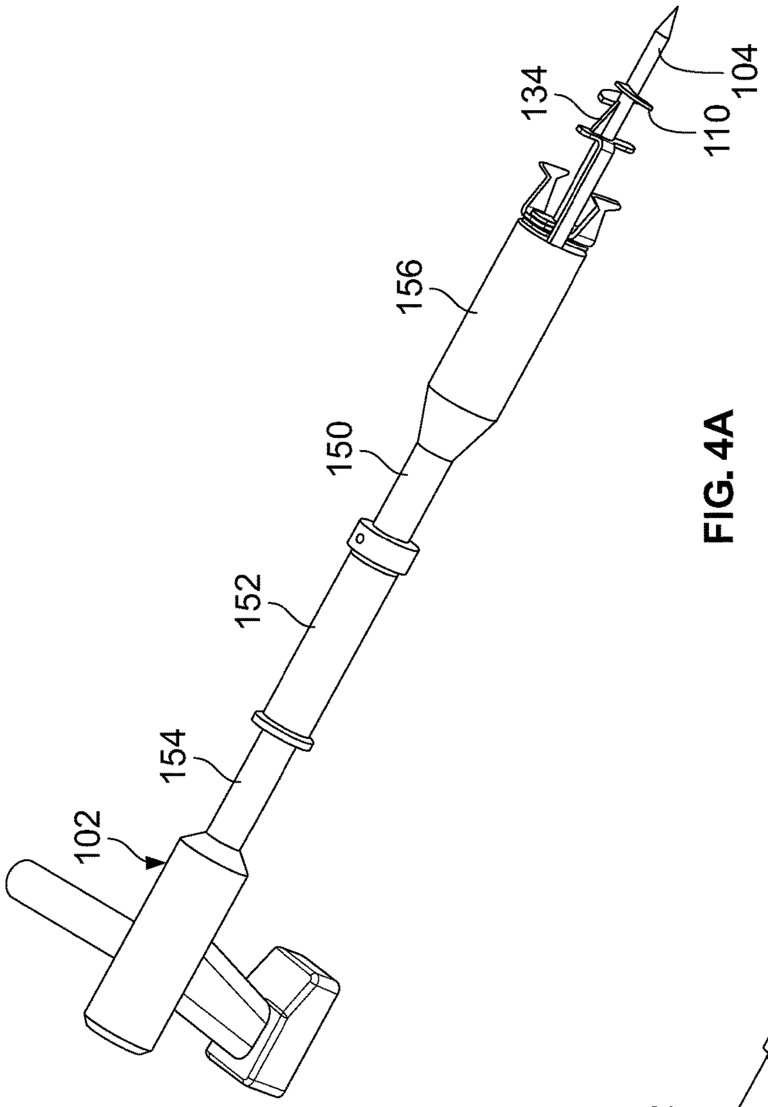
FIGS. 4A and 4B depict a schematic of a weeding device with a housing member and an actuator housing, according to non-limiting embodiments.
Figure 4B:
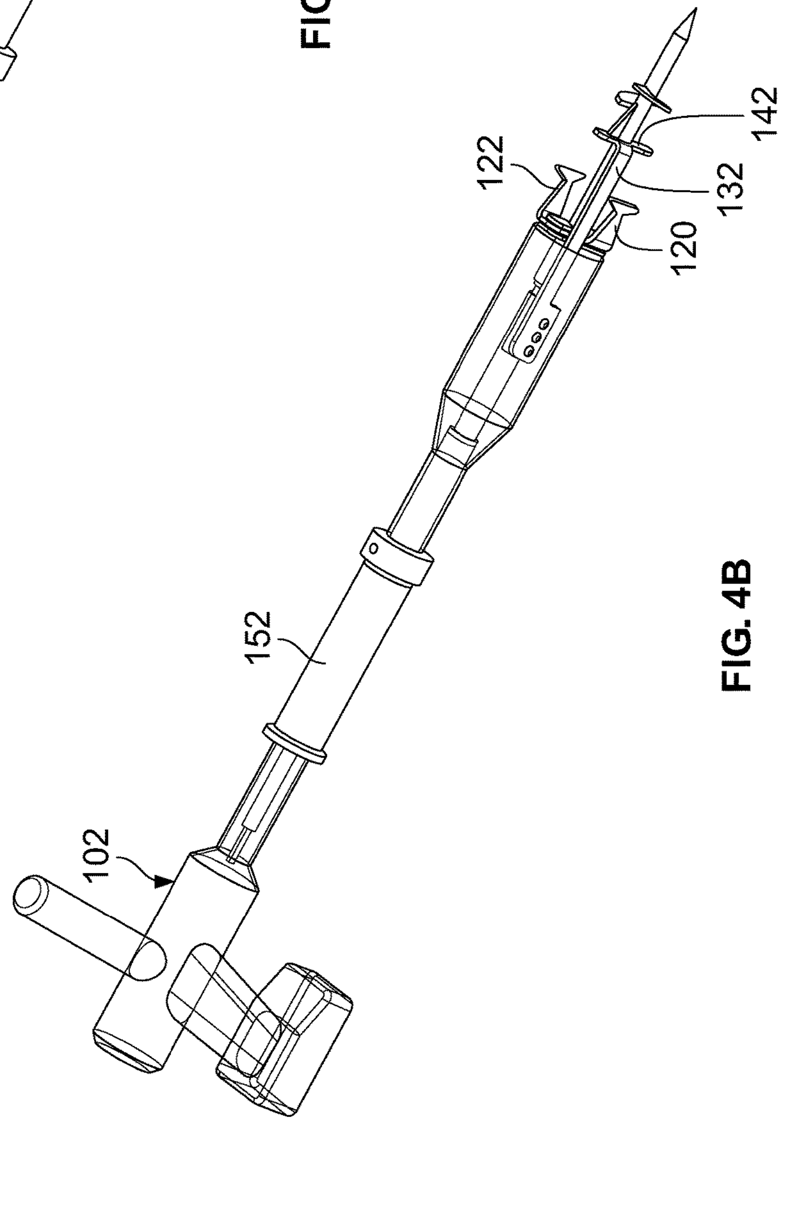
Figure 4C:
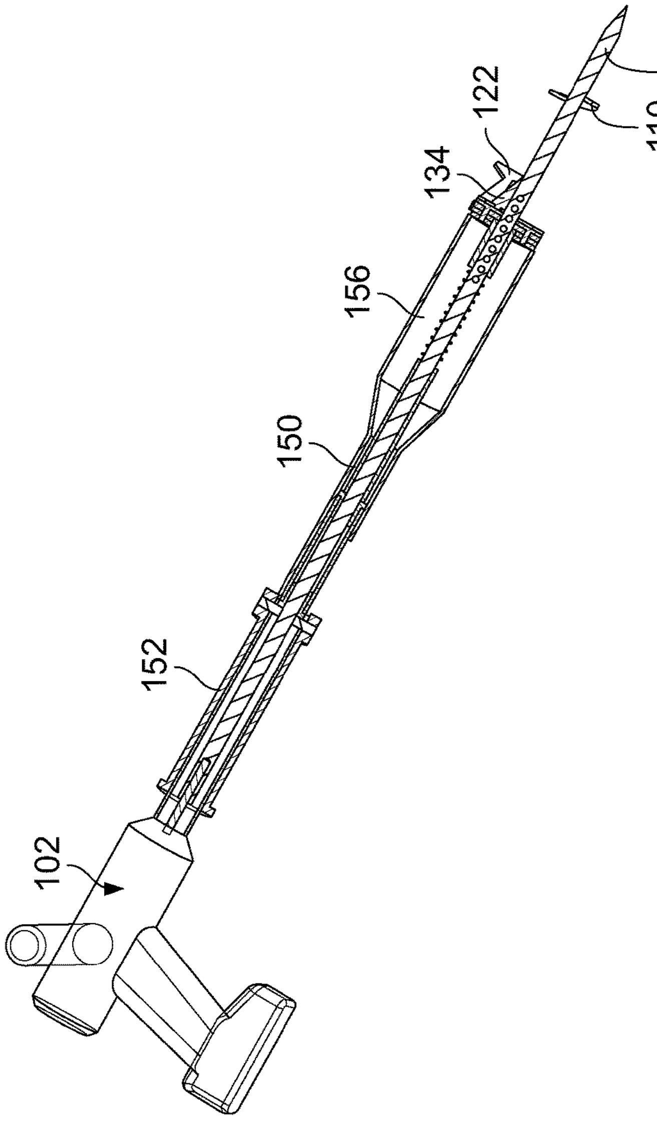
FIGS. 4C and 4D depict a cross-sectional view of the schematic depicted in FIGS. 4A and 4 B, illustrating the actuator housing coupled to the housing member, according to non-limiting embodiments.
Figure 4D:
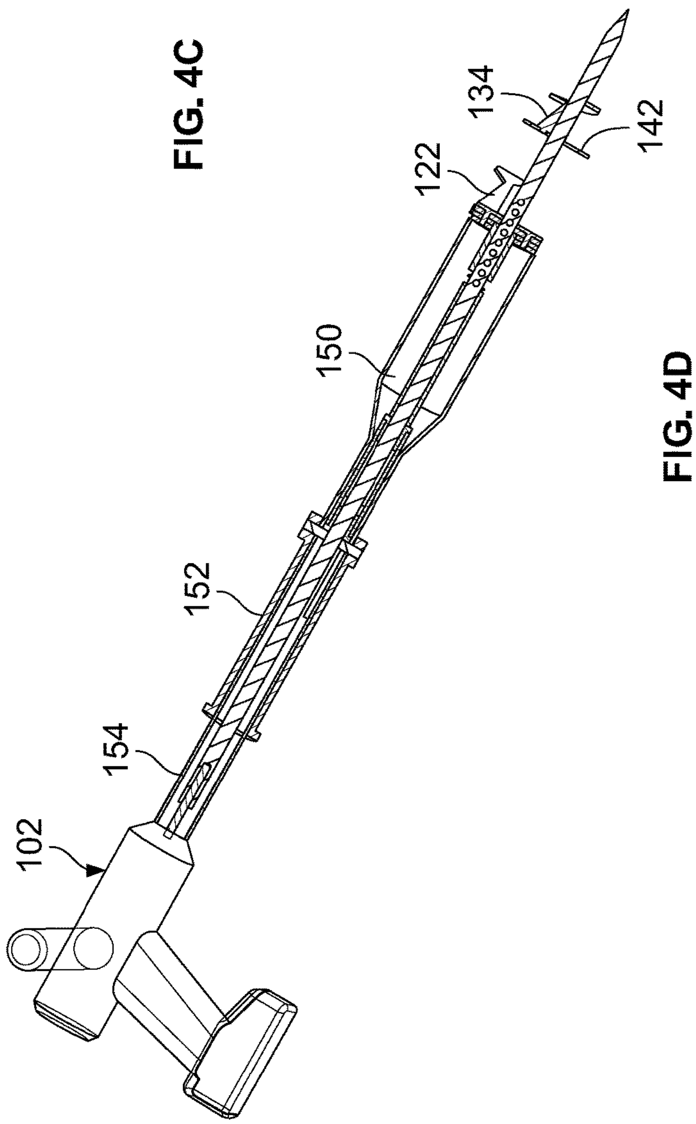

According to some embodiments, the weeding device 100 includes a biasing member 148 that is operatively coupled to the arm 132 and the weed engagement member 114, wherein the biasing member is configured to bias the arm 132 and platform member 142 coupled to the cutting blade 134 away from the auger 110 (see FIGS. 1 and 3).

According to some embodiments, the biasing member 148 comprises a helical spring. However, any components or combination of components suitable for biasing the arm 132 and platform member 142 away from the auger 110 is contemplated.

According to some embodiments, the actuator 136 comprises a shaft casing 128. According to some embodiments, the ejector 130 further comprises a handle operatively coupled to the actuator 136 (such as handle 133 shown in FIG. 5B).

Figure 6A:
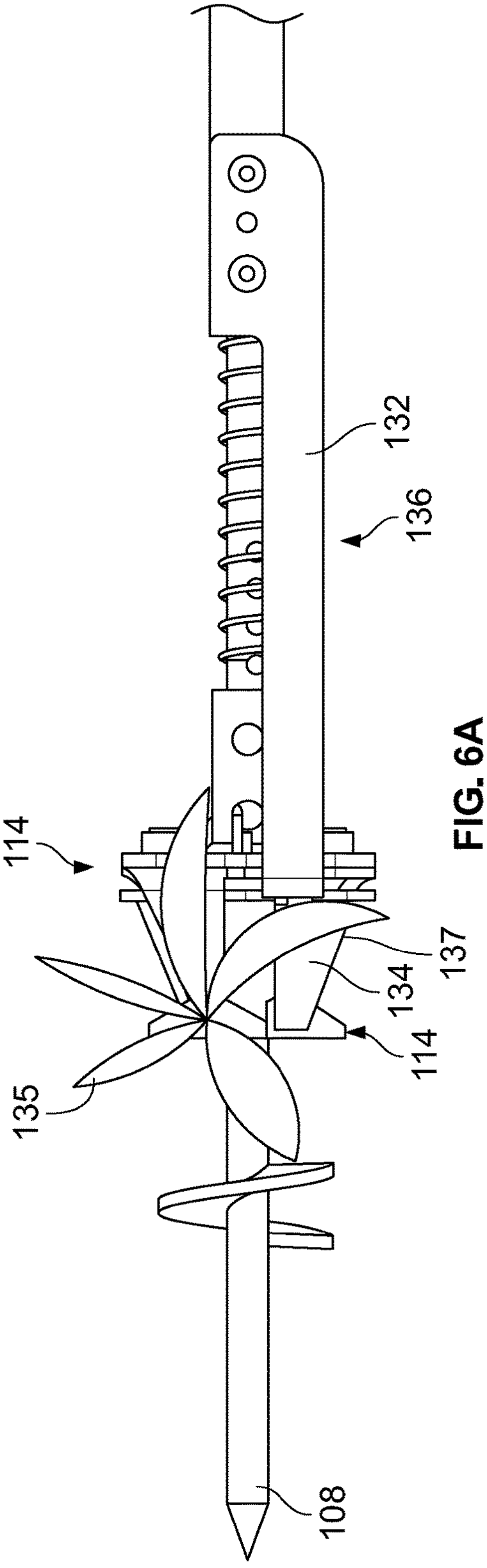
FIGS. 6A and 6B depict enlarged views of an ejector in a first, retracted position and in a second, cutting position, according to non-limiting embodiments.
Figure 6B:
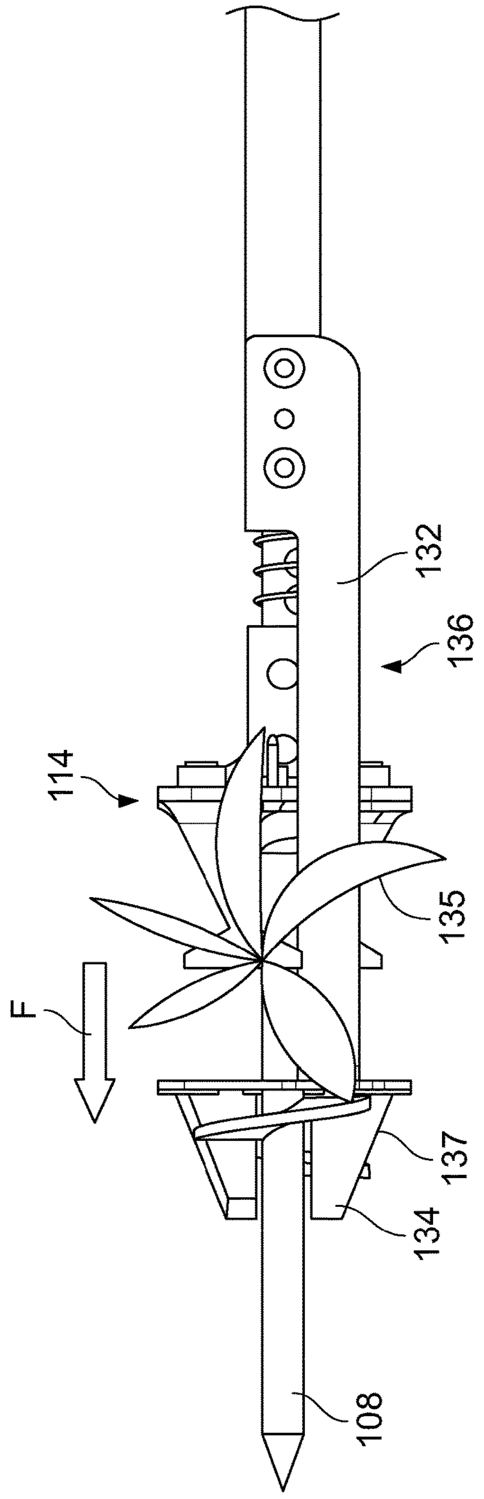
Figure 7:
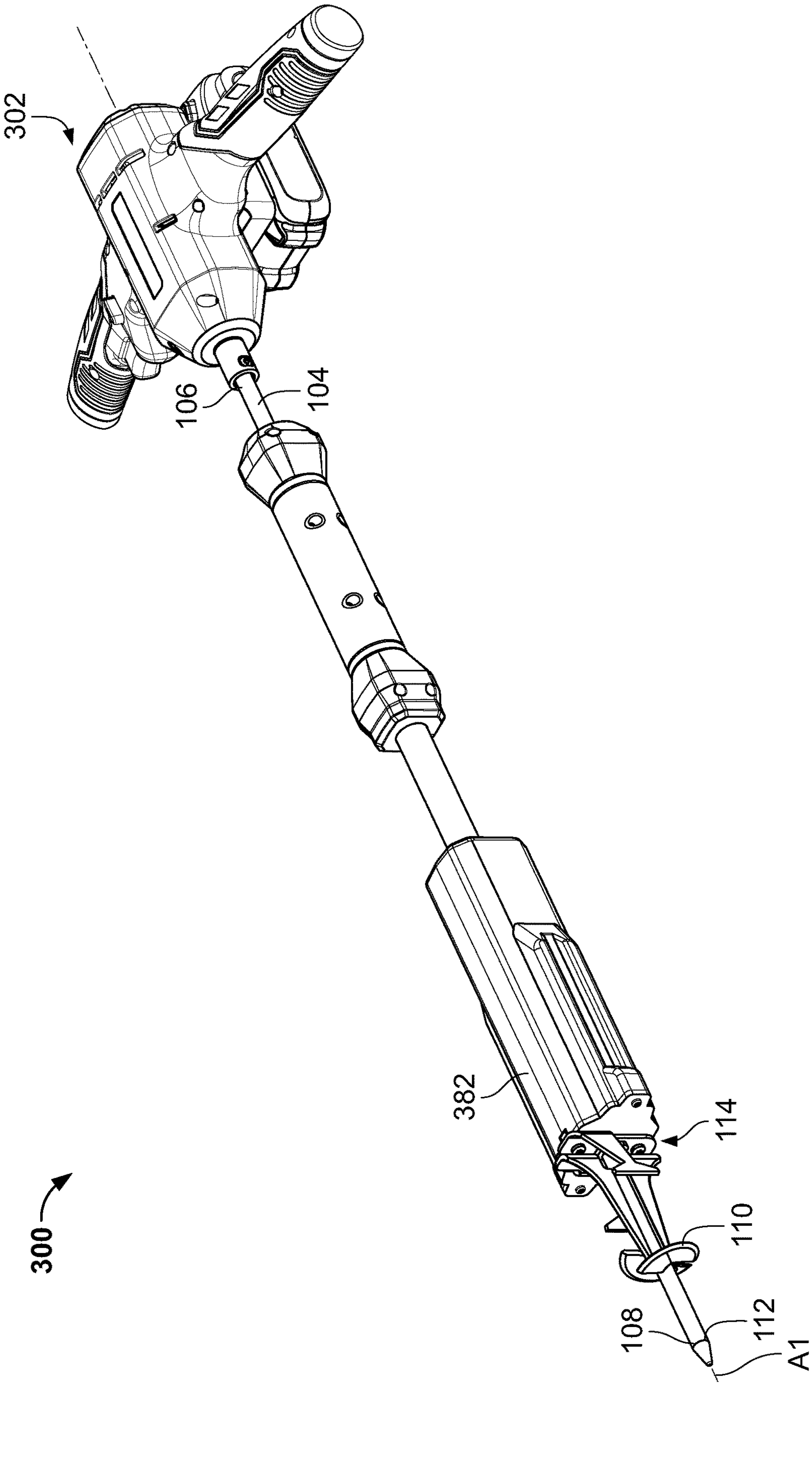
FIG. 7 depicts another example weeding device, according to non-limiting embodiments.

According to some embodiments, the weeding device 100 further comprises a housing member 150 and an actuator housing 152. The housing member 150 comprises a first end 154 configured to operatively couple to a power unit 102, and a second end 156 being a free end proximate the weed engagement member 114 (see FIGS. 4A-4D). The actuator housing 152 is operatively coupled to the actuator 136, which is operatively coupled to the arm 132, and configured to, via axial translation of the arm 132 and the platform member 142 relative to the drive shaft 104, move the cutting blade 134 into cutting engagement with at least a portion of the weed held by the weed engagement member 114 for release therefrom and the ejection from the device. For example, as shown in FIGS. 6A and 6B, actuator 136 is configured to move cutting blade 134, via axial translation of arm 132 and platform member 142 along drive shaft 104 (in the direction of F towards end 108), from a first position (FIG. 6A) to a second position, also referred to herein as a cutting position (FIG. 6B), in which cutting blade 134 is in engagement with at least a portion of a weed held by weed engagement member 114, such as weed portion 135, for release therefrom and ejection from weeding device 100. As cutting blade 134 moves from the first position to the cutting position a blade edge of cutting blade 134, such as blade edge 137, is enabled to cut at least partly through weed portion 135 contacting blade edge 137.

According to some embodiments, the housing member 150 and the actuator housing 152 are rotationally decoupled from the drive shaft 104. The actuator housing 152 may be positioned on the end of the shaft casing 128 near the proximal end 106 of the drive shaft 104, and the actuator housing 152 may be coupled to the actuator 136 by at least one pin or any other suitable fastener(s), which allows the actuator housing 152 to be axially coupled to the actuator 136 while being rotationally decoupled from the drive shaft 104 (see FIGS. 4C and 4D).

Figure 5B:
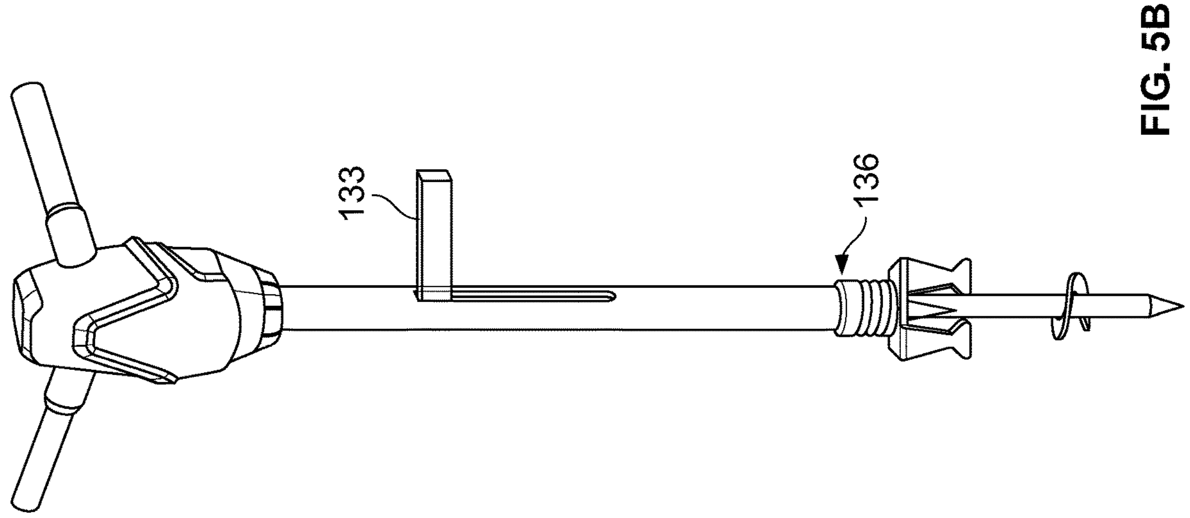
FIG. 5A depict front views of an example power unit, according to non-limiting embodiments.
Figure 5A:
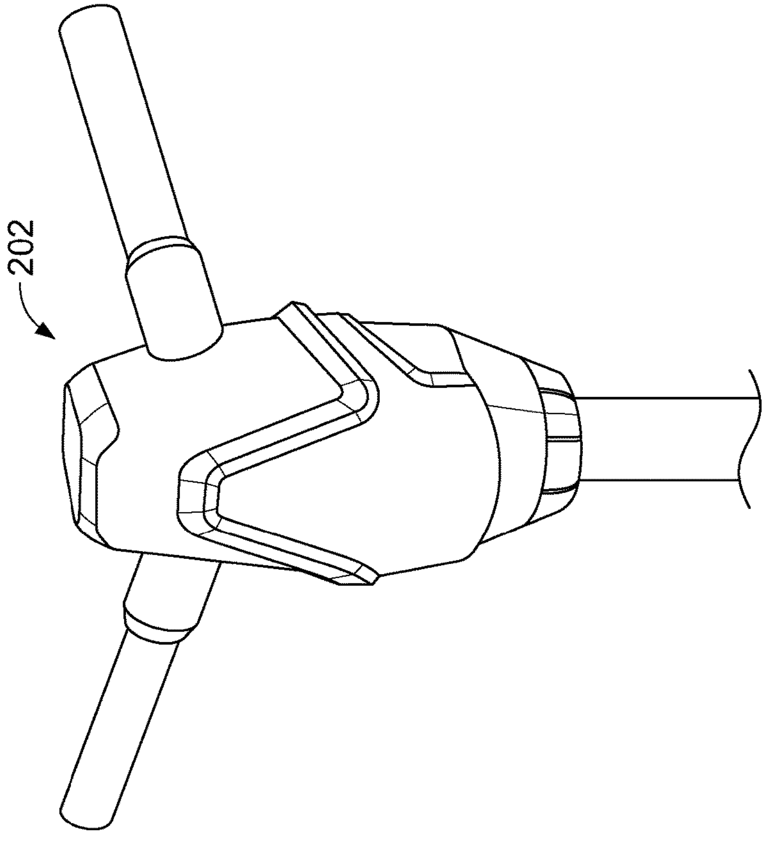

According to some embodiments, the weeding device 100 includes a power unit, such as power unit 202 (see FIGS. 5A and 5B). Any suitable type of power unit 102 that may be operatively coupled to the drive shaft 104 and operate the weeding device 100 to remove weeds from a lawn or garden surface is contemplated, such as a corded drill, or a cordless drill with rechargeable batteries. According to some embodiments, the power unit 102 is detachable from the weeding device 100.

The components of the weeding device 100 including but not limited to the drive shaft 104, auger 110, weed engagement member 114, shaft casing 128, ejector 130, biasing member 148, housing member 150 and actuator housing 152 may be manufactured from any suitable material or combination of materials.

Attention is directed to FIGS. 7 to 9D, which depicts an example device for removing weeds from a lawn or garden surface, also referred to herein as weeding device 300, according to non-limiting embodiments, and in which like or similar elements are denoted by like or similar numbers in FIGS. 1 to 6B. For simplicity and ease of understanding, discussion of the devices and features depicted in FIGS. 7 to 9D will focus on certain similarities and differences from those depicted in FIGS. 1 to 6B.

Similarly to weeding device 100, weeding device 300 comprises drive shaft 104 configured to operatively couple to a power unit 302 at proximal end 106 for rotation about axis A1 defined by drive shaft 104. Distal end 108 of drive shaft 104 also comprises auger 110 and boring member 112. Weeding device 300 further comprises weed engagement member 114 axially coupled to drive shaft 104 along axis A1, near auger 110.

Figure 8A:
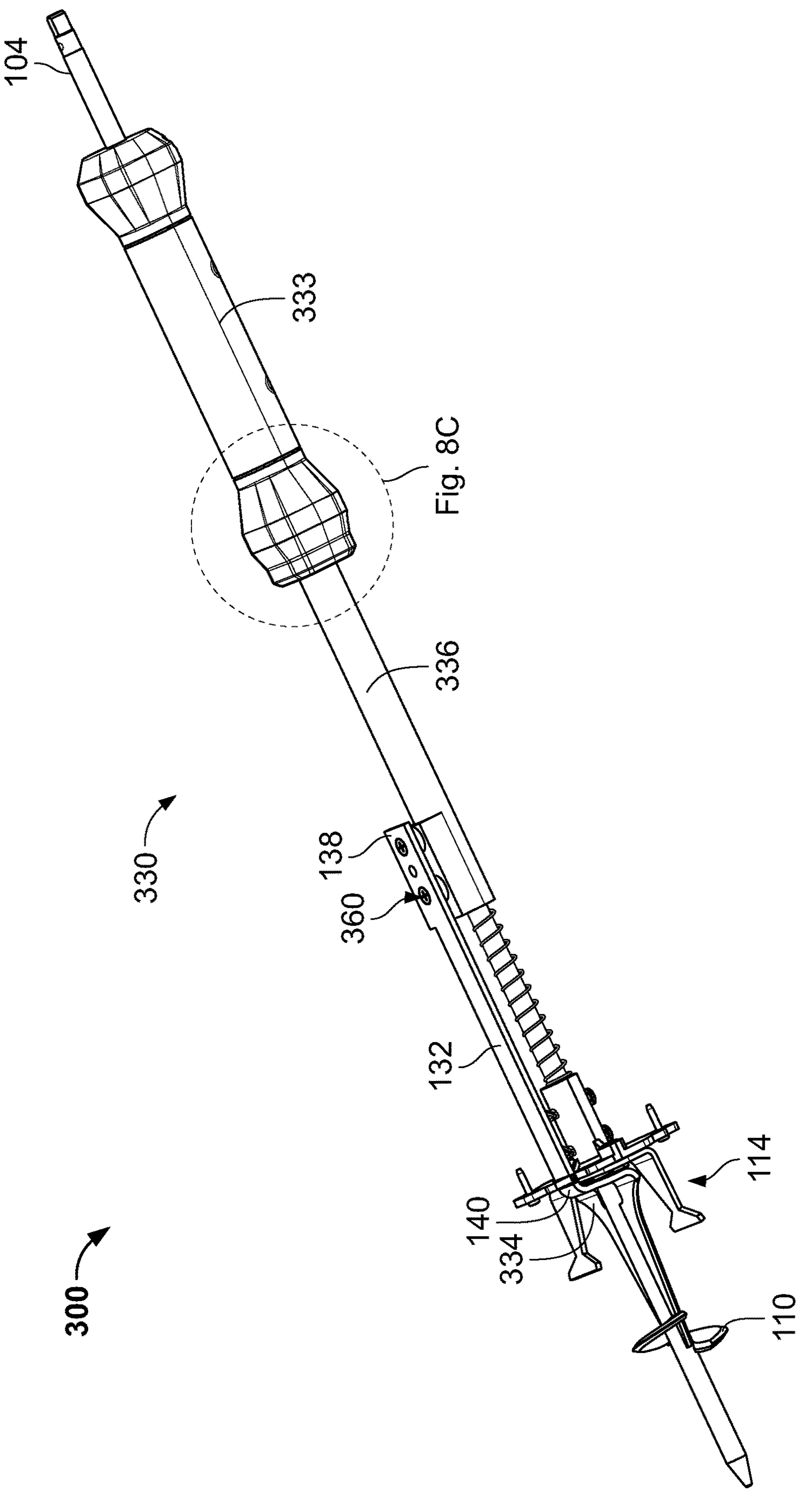
FIGS. 8A and 8B depict an ejector and handle of the weeding device depicted in FIG. 7, according to non-limiting embodiments.
Figure 8B:
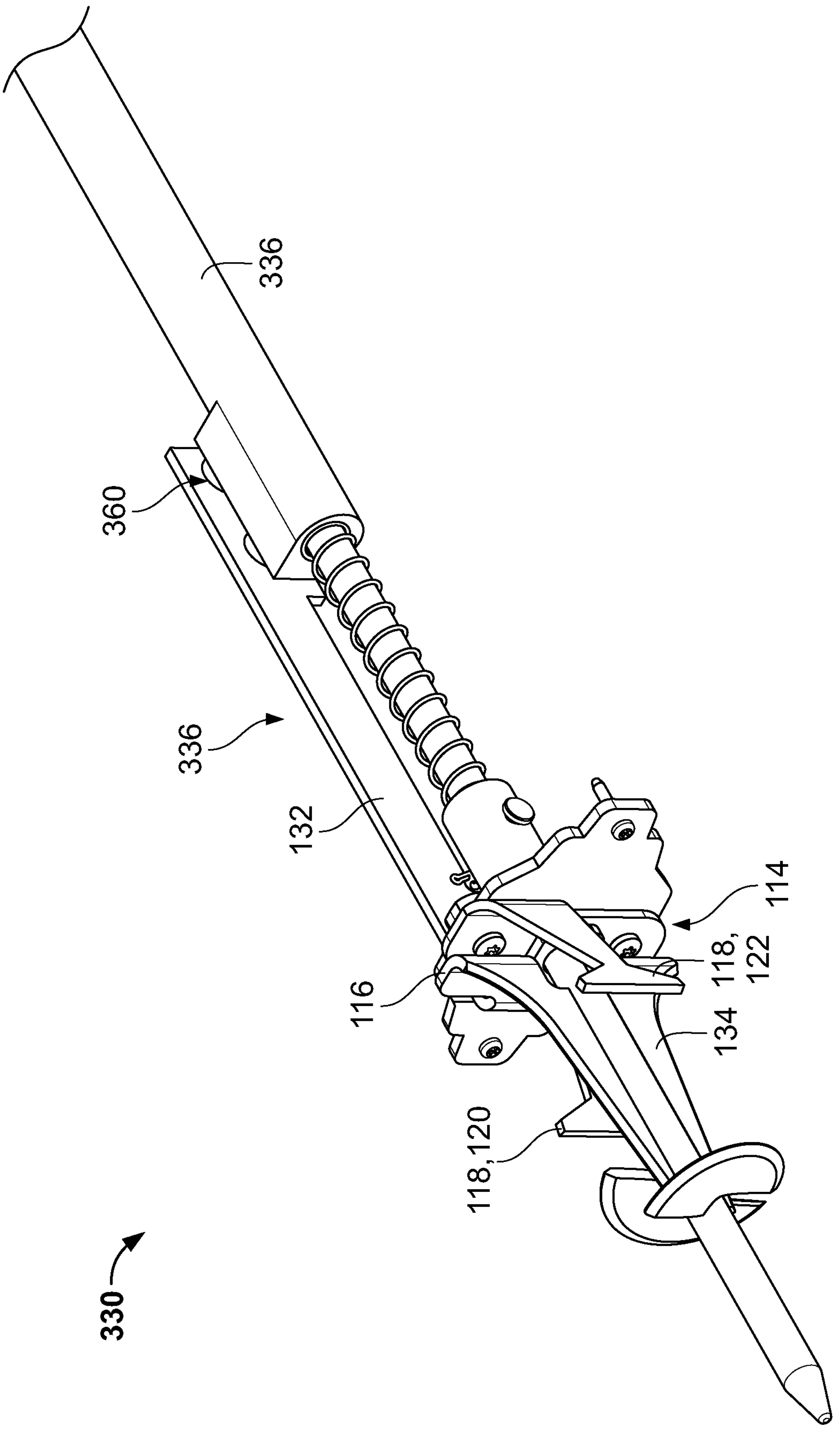
Figure 8C:
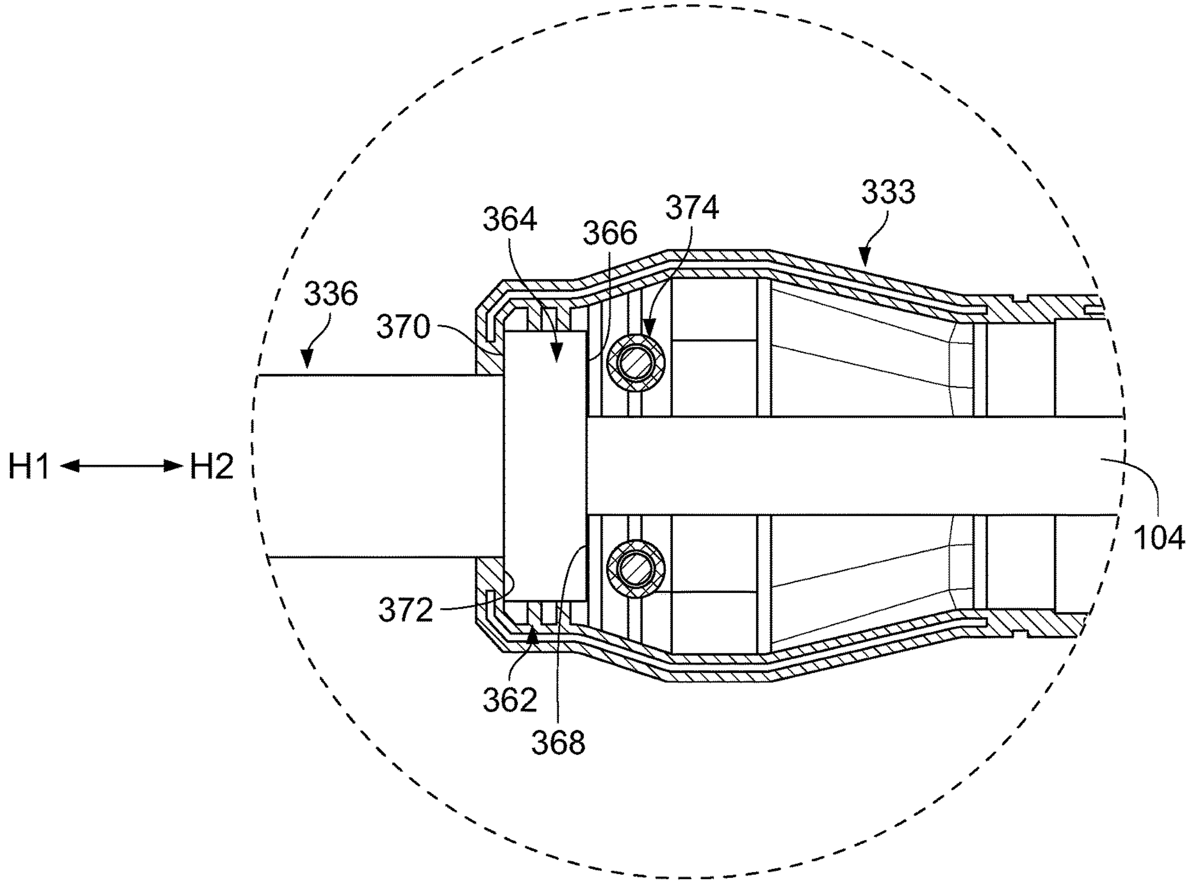
FIG. 8C depicts an enlarged view of an attachment assembly of the handle to the ejector depicted in FIGS. 8A and 8B.

According to some embodiments, weeding device 300 further includes ejector 330 comprising arm 132, cutting blade 334 and actuator 336 (see FIGS. 8A and 8B). Arm 132 comprises first end 138 and second end 140 distal of the first end 138. Second end 140 comprises or is coupled to platform member 142. Actuator 336 is axially coupled to arm 132 (such as via fasteners 360 at first end 138) such that axial translation of actuator 336 along axis A1, for example towards the auger 110, compels axial translation of arm 132, and thereby platform member 142, along axis A1.

According to some embodiments, actuator 336 comprises a handle 333 operatively connected to arm 132 for axial translation therewith. For example, according to some embodiments, handle 333 comprises a recess 362 shaped to hold a portion 364 of actuator 336 therein (see, for example, FIG. 8C). Portion 364 may comprise a first actuator face 366 that is configured to abut with a first handle face 368 of recess 362 when handle 333 is translated in a first axial direction, H1, thereby compelling axial movement of the actuator 336 in axial direction H1 (which may be an extending direction). Portion 364 may comprise a second actuator face 370 configured to abut with a second handle face 372 of recess 362 when handle 333 is translated in a second axial direction, H2, thereby compelling axial movement of the actuator 336 in axial direction H2 (which may be in a retracting direction). However, it is understood that any suitable manner of axially coupling handle 333 to actuator 336 is contemplated.

The Applicant has found that including a handle, such as handle 333, that is configured to direct axial translation of arm 132 (and thereby cutting blade 334) in at least a retracting direction, in addition to biasing member 148, may be helpful in operating the described weeding device for those with limited or reduced strength (rather than solely relying on biasing member 148 to assist with axial translation of arm 138).

According to some embodiments, handle 333 is rotationally decoupled from the driveshaft 104. For example, handle 333 may be coupled to drive shaft 104 via fasteners 374 (FIG. 8C), such as ball bearings and/or bushings. It is understood that any suitable manner of coupling handle 333 to drive draft 104 such that rotation of drive shaft 104 and handle 333 is at least partially decoupled (such as rotationally decoupled in one direction of rotation or rotationally decoupled in multiple directions of rotation) is contemplated.

Figures 9A, 9B:
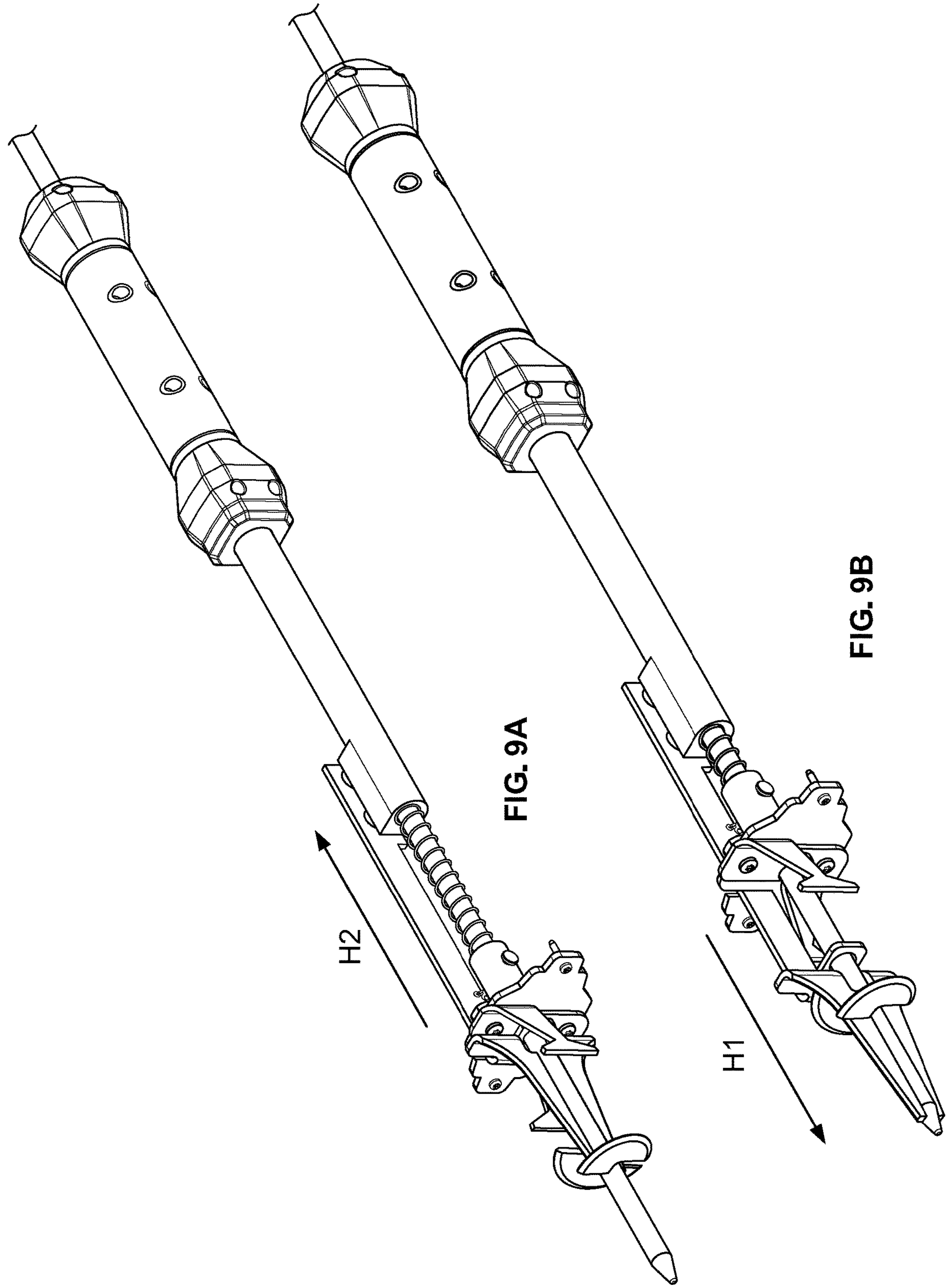
FIGS. 9A, 9B depict the weeding device of FIGS. 7 to 8C in a first position and a second position.
Figure 9C:
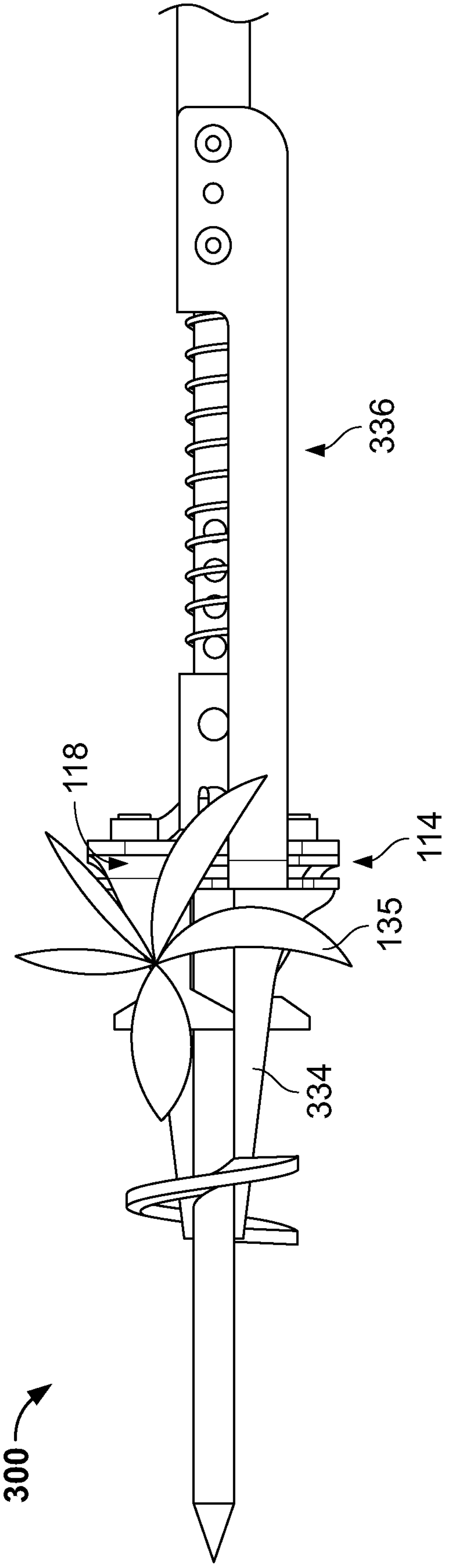
FIGS. 9C to 9F depict enlarged views of the ejector depicted in FIGS. 8A and 8B in a first position and a second position, according to non-limiting embodiments.
Figure 9D:
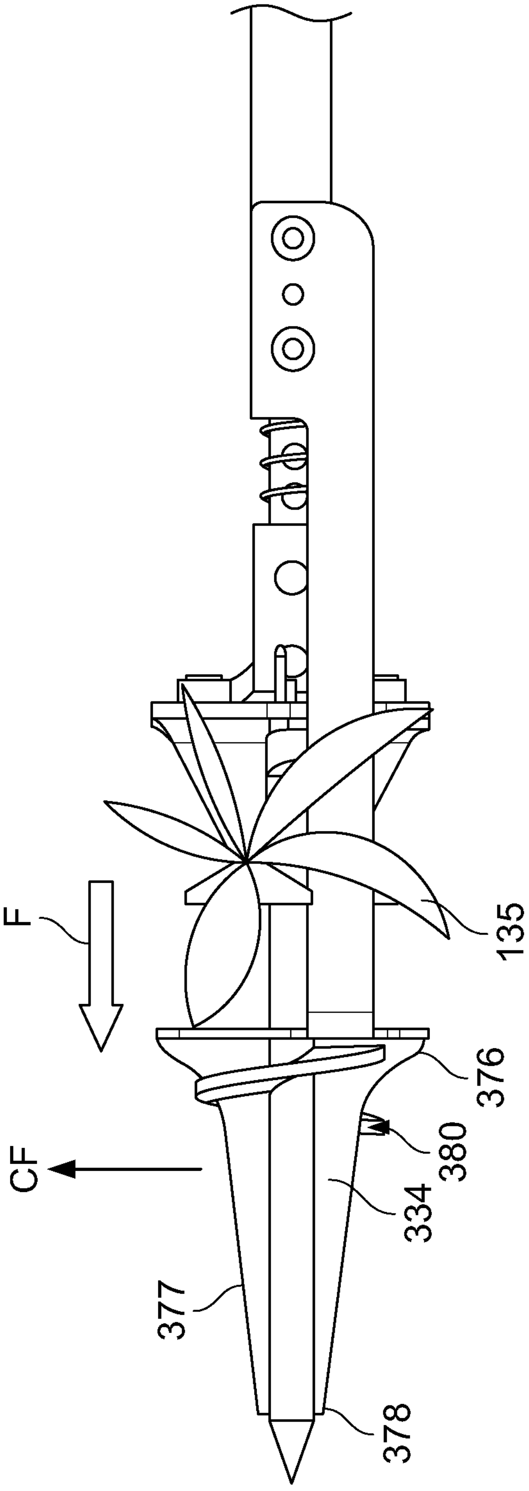
Figure 9F:
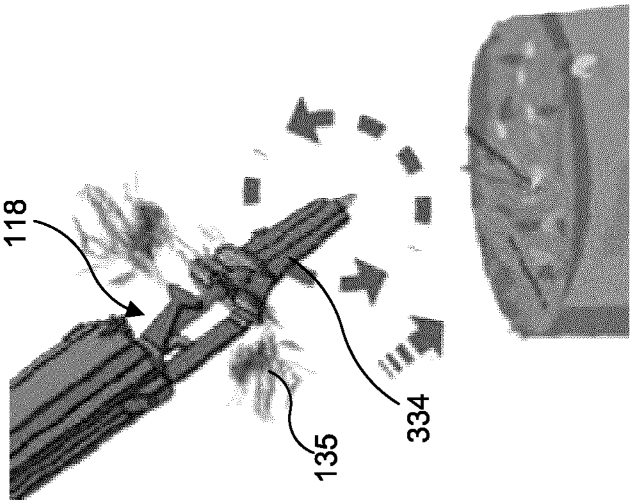
Figure 9E:
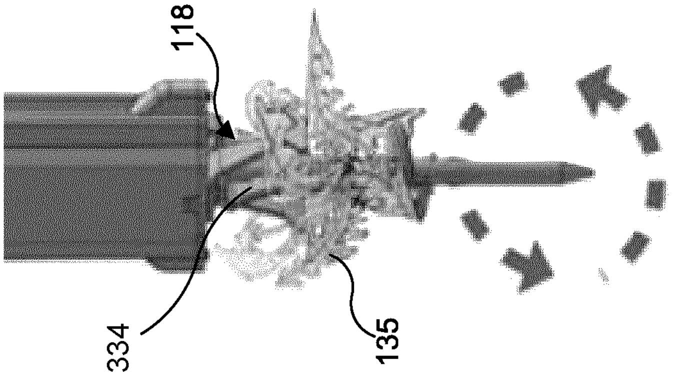

Weeding device 300 comprises cutting blade 334. Similar to cutting blade 134, cutting blade 334 is coupled to platform member 142 of the second end 140 of arm 132, and is oriented to cut at least a portion a weed held by weed engagement member 114, for example, as the drive shaft 104 rotates about axis A1 and/or when the cutting blade is moved to a cutting position (FIG. 9B).

As shown in FIGS. 9C to 9F, cutting blade 334 is generally tapered towards away from a blade root 376 proximate platform member 142 towards a blade tip 378. According to some embodiments, taper 380 of cutting blade 334 is shaped so as to exert a radial cutting force, such as CF, on the at least a portion of the weed during movement of the cutting blade 334 into the cutting position. For example, in operation, as cutting blade 334 is moved from a first position (retracted position) (see, for example, FIGS. 9A, 9C and 9E) to the cutting position (see, for example, FIGS. 9B, 9D and 9F), weed 135 is being held by engagement member 114 and continues to wrap around cutting blade 334 (particularly, if drive shaft 104 continues to rotate about axis A1). Weed 135, under tension, is further subjected to radial cutting force CF as cutting blade 334 is moved to the cutting position, enabling the cutting of weed 135 with less force than without taper 380.

According to some embodiments, weeding device further comprises shroud 382 to at least partially cover actuator 336 and related assemblies (FIG. 7) (shroud 382 is also referred to herein as actuator housing 382).

Persons skilled in the art will appreciate that there are yet more alternative implementations and modifications possible, and that the above examples are only illustrations of one or more implementations. The scope, therefore, is only to be limited by the claims appended hereto.

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as being "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of +5%, +10%, +20%, or +25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A device for removing weeds from a lawn or garden surface, the device comprising:

a drive shaft having a first end and a second end, the first end being configured to operatively couple to a power unit for rotation about a longitudinal axis of the drive shaft and the second end being a free end distal from the first end;

coupled to the second end, an auger having one or more flights about the longitudinal axis and a boring member;

a weed engagement member axially coupled to the drive shaft at a longitudinal position intermediate the auger and the first end, the weed engagement member having:

a base member, and at least one grasping finger depending from the base member towards the auger, the at least one grasping finger being axially offset from the longitudinal axis; and an ejector comprising:

an arm having a first end and a second end distal the first end, the second end having a platform member proximate the base member, the second end being configured to rotationally couple with the drive shaft when the drive shaft is driven in one or more of a first direction of rotation and a second direction of rotation;

a cutting blade coupled to the platform member of the second end of the arm and oriented to cut at least a portion of a weed held by the weed engagement member; and an actuator operatively coupled to the arm and configured to, via axial translation of the arm and the platform member relative to the drive shaft, move the cutting blade into a cutting position in which the cutting blade is in cutting engagement with the at least a portion of the weed held by the weed engagement member for release therefrom and the ejection from the device wherein, when the boring member is in contact with the lawn or garden surface and the drive shaft is driven in the first direction of rotation about the longitudinal axis, the auger is driven into engagement with the at least a portion of the weed and the weed engagement member is drawn towards the lawn or garden surface and into engagement with the at least a portion of the weed.

2. The device of claim 1, wherein the auger has a single flight.

3. The device of claim 1 further enabled to drive the auger away from the lawn or garden surface with the weed engagement member and the at least a portion of the weed when the drive shaft is driven in the second direction of rotation about the longitudinal axis.

4. The device of claim 1, wherein the at least one grasping finger comprises a pair of opposing grasping fingers depending from the base member towards the auger.

5. The device of claim 4, wherein each one of the pair of opposing grasping fingers are angularly offset from the other grasping finger.

6. The device of claim 1, wherein the at least one grasping finger is bi-directional.

7. The device of claim 1, wherein the weed engagement member is in fixed rotation with the drive shaft.

8. The device of claim 1, further comprising a shaft casing proximate the first end of the drive shaft, the shaft casing rotationally decoupled from the drive shaft.

9. The device of claim 8, wherein the actuator comprises the shaft casing.

10. The device of claim 1, wherein the cutting blade is generally tapered away from the platform member.

11. The device of claim 10, wherein the taper of the cutting blade is shaped so as to exert a radial cutting force on the at least a portion of the weed during movement of the cutting blade into the cutting position.

12. The device of claim 1, wherein the auger comprises a guide slot through which at least a portion of the cutting blade travels to reach the cutting position.

13. The device of claim 1, further comprising a biasing member operatively coupled to the arm and the weed engagement member, the biasing member configured to bias the arm and platform member coupled to the cutting blade away from the auger.

14. The device of claim 13, wherein the biasing member comprises a helical spring.

15. The device of claim 1, wherein the actuator comprises a handle operatively connected to the arm for axial translation therewith and rotationally decoupled from the drive shaft.

16. The device of claim 1, further comprising:

a housing member having a first end and a second end, the first end being configured to operatively couple to the power unit and the second end being a free end proximate the weed engagement member, and an actuator housing operatively coupled to the actuator.

17. The device of claim 16, wherein the housing member and the actuator housing are rotationally decoupled from the drive shaft.

18. A motorized system for removing weeds from a lawn or garden surface, the system comprising:

the device according to claim 1; and the power unit.

* * * * *